United States Patent
Chen et al.

(10) Patent No.: US 9,491,348 B2
(45) Date of Patent: Nov. 8, 2016

(54) IMAGING LENS AND IMAGING APPARATUS

(71) Applicant: Sony Corporation, Tokyo (JP)

(72) Inventors: Yonghua Chen, Tokyo (JP); Naoki Miyagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/465,123

(22) Filed: Aug. 21, 2014

(65) Prior Publication Data

US 2015/0092100 A1 Apr. 2, 2015

(30) Foreign Application Priority Data

Sep. 27, 2013 (JP) .................... 2013-201345

(51) Int. Cl.
| | |
|---|---|
| *G02B 9/14* | (2006.01) |
| *G02B 13/18* | (2006.01) |
| *H04N 5/232* | (2006.01) |
| *G02B 13/16* | (2006.01) |
| *G02B 13/00* | (2006.01) |
| *G02B 15/173* | (2006.01) |
| *G02B 9/12* | (2006.01) |
| *G02B 27/64* | (2006.01) |
| *G02B 7/04* | (2006.01) |
| *G02B 27/00* | (2006.01) |
| *G02B 5/00* | (2006.01) |

(52) U.S. Cl.
CPC .......... *H04N 5/23212* (2013.01); *G02B 13/16* (2013.01); *G02B 5/005* (2013.01); *G02B 7/04* (2013.01); *G02B 9/12* (2013.01); *G02B 9/14* (2013.01); *G02B 13/002* (2013.01); *G02B 13/006* (2013.01); *G02B 13/0015* (2013.01); *G02B 13/0045* (2013.01); *G02B 13/18* (2013.01); *G02B 15/173* (2013.01); *G02B 27/0025* (2013.01); *G02B 27/646* (2013.01)

(58) Field of Classification Search
CPC .... G02B 7/04; G02B 13/0045; G02B 13/18; G02B 9/12; G02B 27/646; G02B 27/0025; G02B 13/0015; G02B 13/006; G02B 15/173; G02B 5/005; G02B 9/14; G02B 13/002
USPC .................. 359/716, 740, 784–788, 823
See application file for complete search history.

(56) References Cited

U.S. PATENT DOCUMENTS

2012/0229921 A1* 9/2012 Eguchi ............... G02B 27/4211
359/771

FOREIGN PATENT DOCUMENTS

| JP | 2012-027349 | 2/2012 |
| JP | 2012-226309 | 11/2012 |
| JP | 2013-003324 | 1/2013 |

*Primary Examiner* — Evelyn A Lester
(74) *Attorney, Agent, or Firm* — Michael Best & Friedrich LLP

(57) ABSTRACT

An imaging lens includes a first lens group having positive refractive power, a second lens group having negative refractive power, and a third lens group having positive refractive power. The first to third lens groups are arranged in order from an object side toward an image side. A focusing operation is performed through allowing the second lens group to travel along an optical axis. The following conditional expressions are satisfied, $$0.40 < Da/TL < 0.65 \quad (1)$$

$$0.90 < f3/f < 3.50 \quad (2)$$

where Da is an on-axial distance from an object-sided surface of the second lens group to an image-sided surface of the third lens group in an infinite focus state, TL is an on-axial total length of the imaging lens, f3 is a focal length of the third lens group, and f is a total focal length of the imaging lens in the infinite focus state.

16 Claims, 18 Drawing Sheets

EXAMPLE 1

IMAGING LENS AND IMAGING APPARATUS

CROSS REFERENCE TO RELATED APPLICATIONS

This application claims the benefit of Japanese Priority Patent Application JP 2013-201345 filed Sep. 27, 2013, the entire contents of each which are incorporated herein by reference.

BACKGROUND

The present disclosure relates to an imaging lens and to an imaging apparatus that includes an imaging lens. In detail, the present disclosure relates to an imaging lens that is reduced in size and adopts an optical system of an inner focus type suitable for an electronic camera such as a digital video camera and a digital still camera, a silver halide camera, etc., and also relates to an imaging apparatus that includes such an imaging lens.

An imaging lens is known that adopts an optical system of an inner focus type in which a focus lens group is easily reduced in weight in order to allow the imaging lens to be suitable for automatic focusing operation in shooting a moving image. Japanese Unexamined Patent Application Publication Nos. 2012-226309 and 2013-3324 disclose a large-aperture lens of a Gauss type that adopts the optical system of the inner focus type. Japanese Unexamined Patent Application Publication No. 2012-27349 discloses a large-aperture lens of an intermediate telephoto type that adopts the optical system of the inner focus type.

SUMMARY

In order to address automatic focusing operation in shooting a moving image, it has been desired to develop a bright high-performance large-aperture lens that has less aberration variation caused by a focusing operation and has short total length while adopting an inner focus type to thereby reduce a weight of a focus lens group.

JP2012-226309A discloses a lens system that includes a first lens group having positive power, a second lens group having negative power and serving as a focus lens group, and a third lens group having positive power. In the lens system disclosed in JP2012-226309A, an aperture stop is arranged in the middle of two lenses, in the first lens group, that each have a concave surface having strong power. The first lens group is divided into two by the aperture stop. In the lens system disclosed in JP2012-226309A, a front group in the first lens group has large eccentric sensitivity, and therefore, it is desirable to improve degradation in performance caused by eccentricity at the time of manufacturing the lens system.

In the lens system disclosed in JP2013-3324A, the focus lens group is arranged near the aperture stop, and the focus lens group is reduced in weight. However, in order to secure a peripheral light amount, a diameter of the first lens group is increased, which results in higher cost. In the lens system disclosed in each of JP2012-226309A and JP2013-3324A, the first lens group has a positive-negative-negative-positive symmetrical structure, and a large air lens is sandwiched in the middle of the first lens group. Also, the focus lens group is arranged in a rear part of the whole lens system. This makes it difficult to suppress the total length of the lens system to be small.

In the lens system disclosed in JP2012-27349A, the third lens group has a negative-positive structure, which is advantageous in correcting off-axial aberration. However, the lens system disclosed in JP2012-27349A adopts an intermediate telephoto configuration. This causes longer backfocus and makes it difficult to reduce the size of the lens system.

It is desirable to provide an imaging lens that has favorable optical performance and is capable of achieving reduction in size and high-speed focusing operation while having a large aperture. It is also desirable to provide an imaging apparatus provided with such an imaging lens.

According to an embodiment of the present disclosure, there is provided an imaging lens including a first lens group having positive refractive power, a second lens group having negative refractive power, and a third lens group having positive refractive power. The first to third lens groups are arranged in order from an object side toward an image side. A focusing operation is performed through allowing the second lens group to travel along an optical axis. The following conditional expressions are satisfied, $$0.40 < Da/TL < 0.65 \quad (1)$$

$$0.90 < f3/f < 3.50 \quad (2)$$

where Da is an on-axial distance from an object-sided surface of the second lens group to an image-sided surface of the third lens group in an infinite focus state, TL is an on-axial total length of the imaging lens, f3 is a focal length of the third lens group, and f is a total focal length of the imaging lens in the infinite focus state.

According to an embodiment of the present disclosure, there is provided an imaging apparatus including an imaging lens, and an imaging device configured to output an imaging signal based on an optical image formed by the imaging lens. The imaging lens includes a first lens group having positive refractive power, a second lens group having negative refractive power, and a third lens group having positive refractive power. The first to third lens groups are arranged in order from an object side toward an image side. A focusing operation is performed through allowing the second lens group to travel along an optical axis. The following conditional expressions are satisfied, $$0.40 < Da/TL < 0.65 \quad (1)$$

$$0.90 < f3/f < 3.50 \quad (2)$$

where Da is an on-axial distance from an object-sided surface of the second lens group to an image-sided surface of the third lens group in an infinite focus state, TL is an on-axial total length of the imaging lens, f3 is a focal length of the third lens group, and f is a total focal length of the imaging lens in the infinite focus state.

In the imaging lens or the imaging apparatus according to the above-described embodiments of the present disclosure, the focusing operation is performed through allowing the second lens group to travel along the optical axis. Each of the first to third lens groups has optimized configuration so as to achieve favorable optical performance, reduction in size, and high-speed focusing operation while having a large aperture.

According to the imaging lens or the imaging apparatus of the above-described embodiments of the present disclosure, the focusing operation is performed through allowing the second lens group to travel along the optical axis, and the configuration of each of the first to third lens groups is optimized. As a result, it is possible to achieve the imaging lens or the imaging apparatus that has favorable optical performance, and achieves reduction in size and high-speed focusing operation while having a large aperture.

It is to be noted the effects of the present disclosure are not limited to the effects described above, and may be any effect described in the present disclosure.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Some embodiments of the present disclosure is described below in detail with reference to the accompanying drawings. The description is provided in the following order.
1. Basic Configuration of Lens
2. Functions and Effects
3. Example of Application to Imaging Apparatus
4. Numerical Examples of Lens
5. Other Embodiments

1. Basic Configuration of Lens

Figure 1:
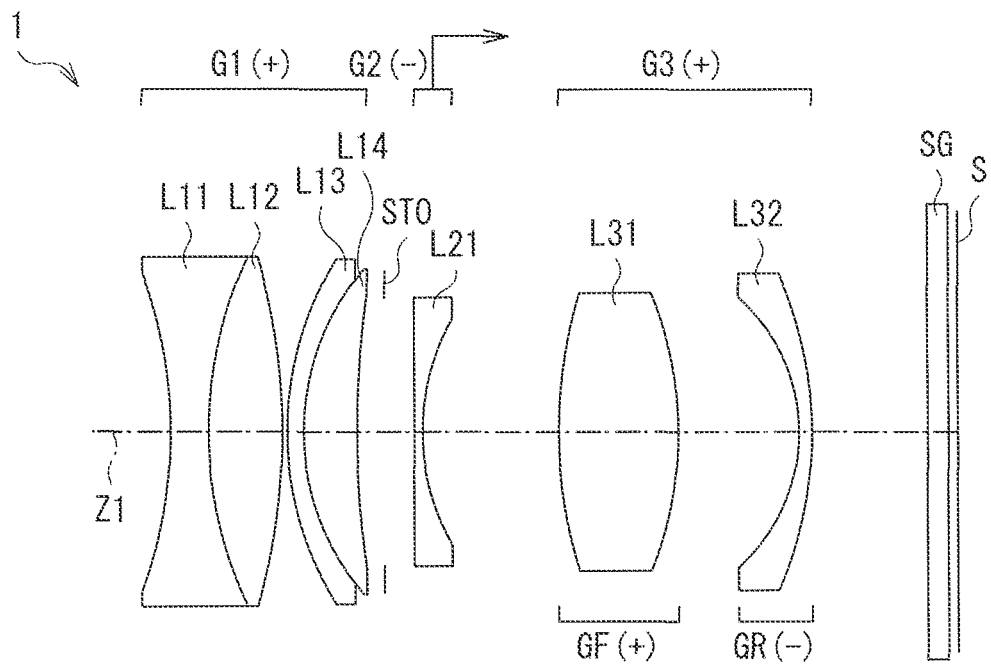
FIG. 1 is a lens cross-sectional view illustrating a first configuration example of an imaging lens according to an embodiment of the present disclosure.

FIG. 1 illustrates a first configuration example of an imaging lens according to an embodiment of the present disclosure. FIGS. 2 to 11 illustrate second to eleventh configuration examples of the imaging lens according to the present embodiment of the disclosure, respectively. Numerical examples in which specific numerical values are applied to these configuration examples are described later. In FIG. 1, etc., the reference sign "S" denotes image plane, and the reference sign "Z1" denotes an optical axis. An optical member SG may be provided between the imaging lens and the image plane S. The optical member SG may be, for example, a sealant glass for protecting an imaging device, various optical filters, and/or the like. In FIG. 1, etc., signs (+) and (−) attached to the reference signs of the respective lens groups correspond to signs of power of the respective lens groups.

A configuration of the imaging lens according to the present embodiment is described below in correspondence with the configuration examples illustrated in FIG. 1, etc. where appropriate; however, the technology of the present disclosure is not limited to the illustrated configuration examples.

The imaging lens according to the present embodiment substantially includes three lens groups, that are, a first lens group G1, a second lens group G2, and a third lens group G3 that are arranged in this order from an object side along the optical axis Z1. The first lens group G1 has positive refractive power, the second lens group G2 has negative refractive power, and the third lens group G3 has positive refractive power.

FIGS. 1 to 11 each illustrate a lens arrangement in an infinite focus state. In FIG. 1, etc., an arrow attached to a lens group shows a direction in which a focus lens group travels when a focusing operation is performed from an infinite object side toward a short-distance object side. As illustrated in FIG. 1, etc., in the imaging lens according to the present embodiment, the focusing operation is performed through allowing the second lens group G2 to travel along the optical axis Z1.

The first lens group G1 may desirably include two or more negative lens components and two or more positive lens components. The third lens group G3 may desirably include a front group GF that has positive refractive power and a rear group GR that has negative refractive power. The second lens group G2 may desirably include a single lens or two lens components.

Also, the imaging lens according to the present embodiment may desirably satisfy predetermined conditional expressions, etc. which are described later.

2. Functions and Effects

Next, functions and effects of the imaging lens according to the present embodiment are described. Together therewith, favorable configuration examples of the imaging lens according to the present embodiment are described.

It is to be noted that the effects described in the present specification are mere examples. The effects of the present disclosure are not limited thereto, and may include other effects.

In the imaging lens according to the present embodiment, the focusing operation is performed through allowing the second lens group G2 to travel along the optical axis Z1, and the configuration of each of the first to third lens groups is optimized. As a result, it is possible to achieve favorable optical performance, reduction in size, and high-speed focusing operation while achieving large aperture. Also, it is possible to reduce the number of components and to decrease difficulty in manufacturing the imaging lens.

In a Gauss-type lens system that has a positive-negative-negative-positive symmetrical structure, an air lens that has a large on-axial spacing is interposed therein, which prevents reduction in on-axial thickness of the first lens group G1. Therefore, it may be desirable to appropriately arrange, in the first lens group G1, two or more negative lens components and two or more positive lens components in an arrangement different from the Gauss-type arrangement, so that incident light rays be slightly diverged first and then be converged. This makes it possible to favorably correct spherical aberration and on-axial chromatic aberration while reducing the on-axial thickness of the first lens group G1. Further, the smaller on-axial thickness of the first lens group G1 is advantageous in reduction in size of the optical system, and improves portability of the imaging lens.

The imaging lens according to the present embodiment adopts an inner-focus-type optical system in which the second lens group G2 serves as the focus lens group. This allows the focus lens group to have a simpler configuration and a reduced weight, which lowers difficulty in manufacturing the imaging lens. It is to be noted that a travel amount of the focus lens group may be desirably smaller in order to reduce total length of the imaging lens. Moreover, it may be desirable to appropriately set the refractive power of the second lens group G2 in order to suppress variation in aberration.

In order to suppress variation in aberration when the focusing operation is performed from an object at the infinite to an object at a short distance, the second lens group G2 may desirably include a single lens made of low-dispersion glass. Alternatively, the second lens group G2 may desirably include two lens components that may be a positive lens and a negative lens arranged in this order, or may be a negative lens and a positive lens arranged in this order.

Also, in order to achieve reduction in size while securing a sufficient travel amount of the focus lens group, it is necessary to set the aperture stop STO at an appropriate position. Further, the aperture unit and a focus mechanism may be desirably arranged at positions adjacent to each other, or at positions close to each other, in view of the arrangement in the optical system.

Taking into consideration reduction in weight of the optical system, securing the travel range of the second lens group G2 for the focusing operation, and correction of aberration, a larger spacing may be desirably secured between the second lens group G2 and the third lens group G3. In this case, the third lens group G3 that has positive refractive power is further away from the aperture stop STO. In order to make correction in aberration including distortion, the third lens group G3 may desirably have a configuration that takes into configuration both on-axial aberration and off-axial aberration.

In the imaging lens according to the present embodiment, it may be desirable that part, of the third lens group G3, on the object side of the largest on-axial air spacing in the third lens group G3 serve as a front sub-lens group (a front group GF) that has positive refractive power, and part, of the third lens group G3, on the image side of that largest on-axial air spacing serve as a rear sub-lens group (a rear group GR) that has negative refractive power. By thus arranging the sub-lens group having negative refractive power on the image side in the third lens group G3 having positive refractive power, a function of canceling the on-axial aberration in the front sub-lens group having positive refractive power is retained. Also, by such an arrangement, an incidence height of off-axial light rays is increased, which makes the imaging lens advantageous in securing a function of cancelling off-axial aberration (in particular, distortion).

Taking into consideration what has been described above, the imaging lens according to the present embodiment may desirably satisfy the following Conditional expressions (1) and (2), $$0.40 < Da/TL < 0.65 \quad (1)$$

$$0.90 < f3/f < 3.50 \quad (2)$$

where Da is an on-axial distance from an object-sided surface of the second lens group G2 to an image-sided surface of the third lens group G3 in the infinite focus state, TL is an on-axial total length of the imaging lens, f3 is a focal length of the third lens group G3, and f is a total focal length of the imaging lens in the infinite focus state.

Conditional expression (1) defines a ratio of the on-axial distance from the object-sided surface of the second lens group G2 to the image-sided surface of the third lens group G3 with respect to the on-axial total length of the imaging lens in the infinite focus state. When a value of Da/TL is smaller than the lower limit in Conditional expression (1), the distance from the second lens group G2 to the image plane in the infinite focus state becomes shorter. Accordingly, the focusing range of the second lens group G2 becomes shorter and the eccentric sensitivity becomes larger, which further increases variation in aberration. Also, an appropriate spacing is not allowed to be secured between the front sub-lens group having positive refractive power and the rear sub-lens group having negative refractive power in the third lens group G3, which will make it difficult to correct off-axial aberrations. When the value of Da/TL is larger than the upper limit in Conditional expression (1), the distance from the second lens group G2 to the image plane in the infinite focus state becomes longer. Accordingly, the on-axial thickness of the first lens group G1 becomes smaller, which makes it difficult to correct on-axial aberration such as spherical aberration. Also, the total length of the imaging lens becomes longer, which makes it difficult to reduce the size thereof.

In order to achieve the effects more certainly, the numerical range in Conditional expression (1) may be more desirably set to a range shown in the following Conditional expression (1a).

$$0.45 < Da/TL < 0.60 \quad (1a)$$

Conditional expression (2) defines a ratio of the focal length of the third lens group G3 with respect to the total focal length of the imaging lens. When a value of f3/f is smaller than the lower limit in Conditional expression (2), the focal length of the third lens group G3 becomes shorter, and positive refractive power becomes stronger. This increases an amount of change in angle of light rays before and after passing through the third lens group G3. Accordingly, variation in astigmatism during the focusing operation is increased, which makes it difficult to correct off-axial aberration. When the value of f3/f is larger than the upper limit in Conditional expression (2), the focal length of the third lens group G3 becomes longer, and positive refractive power becomes weaker. This increases backfocus of the imaging lens, which makes it difficult to reduce total length of the imaging lens.

In order to achieve the effects more certainly, the numerical range in Conditional expression (2) may be more desirably set to a range shown in the following Conditional expression (2a).

$$1.00 < f3/f < 3.20 \quad (2a)$$

In particular, when the aperture stop STO is adjacent to the second lens group G2, the numerical range in Conditional expression (2) may be more desirably set to a range shown in the following Conditional expression (2b) in order to achieve the effects more certainly.

$$1.00 < f3/f < 2.6 \quad (2b)$$

Moreover, the imaging lens according to the present embodiment may desirably satisfy the following Conditional expression (3), $$0.60 < |f2/f| < 5.00 \quad (3)$$

where f2 is a focal length of the second lens group G2.

Conditional expression (3) relates to a ratio of the focal length of the second lens group G2 with respect to the total focal length of the imaging lens. When a value of |f2/f| is smaller than the lower limit in Conditional expression (3), the focal length of the second lens group G2 becomes shorter, and the power of the focus lens group becomes stronger, which causes the travel amount of the second lens group G2 through the focusing operation to be smaller. As a result, the eccentric sensitivity is increased, and correction of variation in aberration becomes difficult. When the value of |f2/f| is larger than the upper limit in Conditional expression (3), the focal length of the second lens group G2 becomes longer, and the power of the focus lens group becomes weaker, which causes the travel amount of the second lens group G2 through the focusing operation to be longer. As a result, reduction in total length of the imaging lens becomes difficult, and which in turn makes it difficult to reduce the size of the imaging lens.

In order to achieve the effects more certainly, the numerical range in Conditional expression (3) may be more desirably set to a range shown in the following Conditional expression (3a).

$$0.60 < |f2/f| < 3.00 \quad (3a)$$

Moreover, in the imaging lens according to the present embodiment, the third lens group G3 may desirably include the front group GF having positive refractive power and the rear group GR having negative refractive power. Also, the following Conditional expression (5) may be desirably satisfied which relates to a ratio of a focal length f_3fr of the rear group GR with respect to the focal length f3 of the third lens group G3, $$-9.00 < f\_3fr/f3 < -0.10 \quad (4)$$

where f_3fr is the focal length of the rear group GR in the third lens group G3.

When a value of f_3fr/f3 is smaller than the lower limit in Conditional expression (4), the focal length of the third lens group G3 becomes shorter, and the refractive power of the rear group GR having negative refractive power becomes weaker. This makes it difficult to correct peripheral aberration such as distortion. When the value of f_3fr/f3 is larger than the upper limit of Conditional expression (4), the focal length of the third lens group G3 becomes longer, and the refractive power of the rear group GR becomes stronger. As a result, aberration is corrected excessively, which makes it difficult to secure a peripheral light amount.

In order to achieve the effects more certainly, the numerical range in Conditional expression (4) may be more desirably set to a range shown in the following Conditional expression (4a).

$$-7.00 < f\_3fr/f3 < -0.40 \quad (4a)$$

In particular, when the aperture stop STO is arranged closer to the object side than the second lens group G2 is, the numerical range in Conditional expression (4) may be more desirably set to a range shown in the following Conditional expression (4b) in order to achieve the effects of the present embodiment more certainly.

$$-2.00 < f\_3fr/f3 < -0.40 \quad (4b)$$

Moreover, the imaging lens according to the present embodiment may preferably satisfy the following Conditional expression (5) related to a ratio of an on-axial spacing from an image-sided surface of the second lens group G2 to an object-sided surface of the third lens group G3 in the infinite focus state with respect to the focal length of the second lens group G2, $$0 < |Db/f2| < 0.50 \quad (5)$$

where Db is the on-axial spacing between the image-sided surface of the second lens group G2 and the object-sided surface of the third lens group G3 in the infinite focus state.

When a value of |Db/f2| is smaller than the lower limit in Conditional expression (5), the focal length of the second lens group G2 becomes longer, or the on-axial spacing between the image-sided surface of the second lens group G2 and the object-sided surface of the third lens group G3 becomes shorter. When the focal length of the second lens group G2 becomes longer, the power of the focus lens group becomes weaker. Accordingly, the travel amount of the second lens group G2 through the focusing operation is increased. This makes it difficult to reduce total length of the imaging lens, and therefore makes it difficult to reduce the size of the imaging lens. When the on-axial spacing between the image-sided surface of the second lens group G2 and the object-sided surface of the third lens group G3 becomes shorter, the field curvature is increased, and variation in aberration through the focusing operation is increased. When the value of |Db/f2| is larger than the upper limit in Conditional expression (5), the focal length of the second lens group G2 becomes shorter, the eccentric sensitivity becomes larger, and also, correction of variation in aberration becomes difficult. Further, it becomes necessary to increase the number of the second lens group G2 in order to improve performance, which makes it difficult to achieve higher speed in the focusing operation.

In order to achieve the effects more certainly, the numerical range in Conditional expression (5) may be more desirably set to a range shown in the following Conditional expression (5a).

$$0.05 < |Db/f2| < 0.45 \quad (5a)$$

Further, the following Conditional expression (6) may be desirably satisfied which relates to a ratio of an on-axial spacing from an image-sided surface of the front group GF to an object-sided surface of the rear group GR with respect to the focal length of the third lens group G3, $$0 < D\_3fr/f3 < 0.45 \quad (6)$$

where $D\_3fr$ is an on-axial spacing between an image-sided surface of the front group GF and an object-sided surface of the rear group GR in the third lens group G3.

By securing an appropriate spacing between the front group GF and the rear group GR in a range that is not smaller than the lower limit in Conditional expression (6) and not larger than the upper limit in Conditional expression (6), the imaging lens becomes advantageous in correcting both on-axial aberration and off-axial aberration.

In order to achieve the effects more certainly, the numerical range in Conditional expression (6) may be more desirably set to a range shown in the following Conditional expression (6a).

$$0.05 < D\_3fr/f3 < 0.35 \quad (6a)$$

3. Example of Application to Imaging Apparatus

Figure 34:
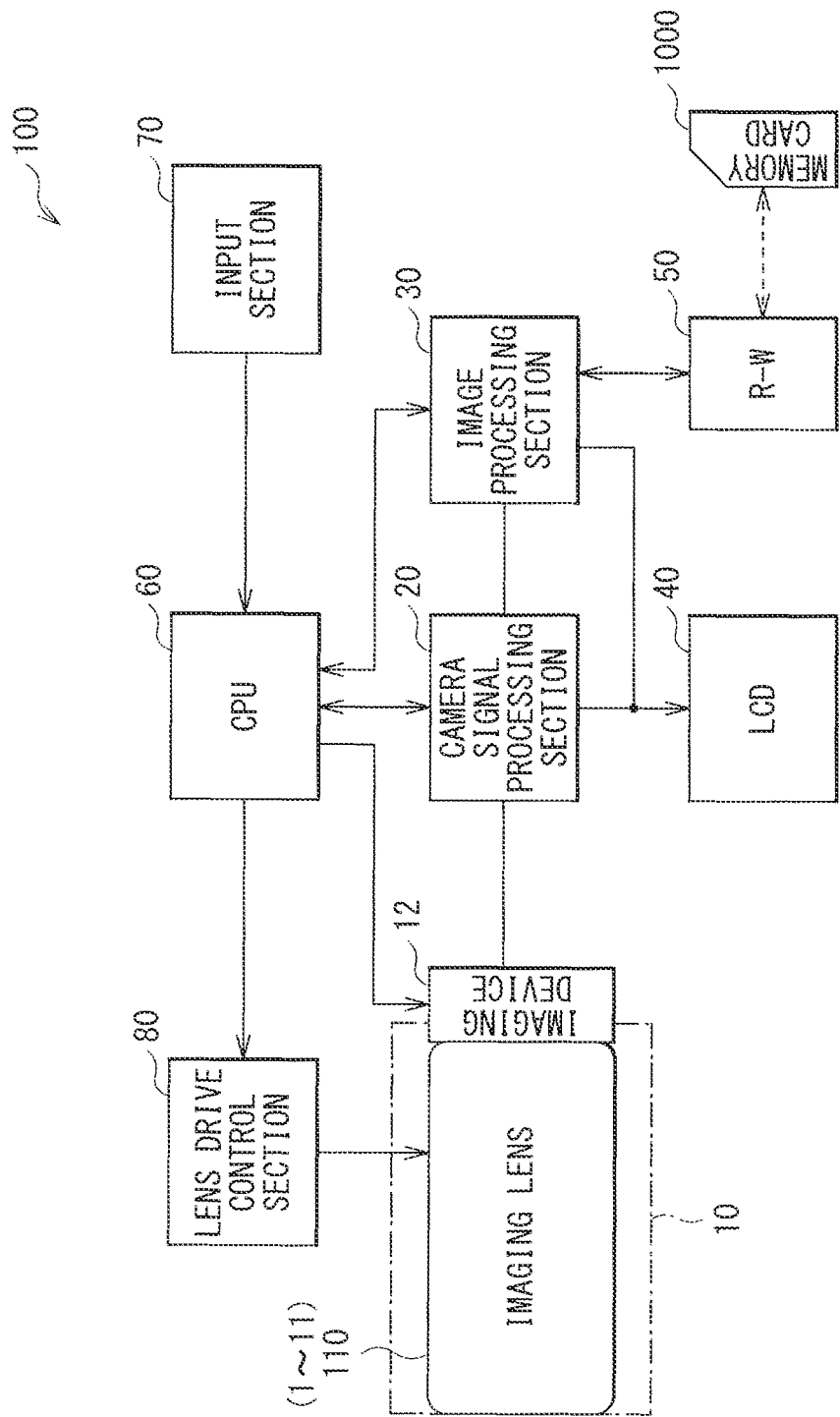
FIG. 34 is a block diagram illustrating a configuration example of an imaging apparatus.

FIG. 34 illustrates a configuration example of an imaging apparatus 100 to which the imaging lens according to the present embodiment is applied. The imaging apparatus 100 may be, for example, a digital still camera. The imaging apparatus 100 may include a camera block 10, a camera signal processing section 20, an image processing section 30, an LCD (Liquid Crystal Display) 40, a R-W (Reader-Writer) 50, a CPU (Central Processing Unit) 60, an input section 70, and a lens drive control section 80.

The camera block 10 has an imaging function. The camera block 10 includes an optical system including an imaging lens 110, and an imaging device 12. The imaging device 12 may be, for example, a CCD (Charge Coupled Device), a CMOS (Complementary Metal Oxide Semiconductor), or the like. The imaging device 12 outputs an imaging signal (an image signal) based on an optical image by converting the optical image formed by the imaging lens 110 into an electric signal. As the imaging lens 110, any of the imaging lenses 1 to 11 in the respective configuration examples shown in FIGS. 1 to 11 is applicable.

The camera signal processing section 20 performs, on the image signal outputted from the imaging device 12, various signal processes such as an analog-to-digital conversion, noise removal, image quality correction, and conversion into a luminance-color-difference signal.

The image processing section 30 performs recording and reproducing processes on the image signal. The image processing section 30 performs processes such as a compression-encoding/extension-decoding process on the image signal based on a predetermined image data format, a conversion process on data specification such as resolution, etc.

The LCD 40 has a function of displaying various data including, for example, an operation state of a user with respect to the input section 70 and shot images. The R-W 50 writes, in the memory card 1000, image data encoded by the image processing section 30, and reads the image data written in the memory card 1000. The memory card 1000 may be, for example, a semiconductor memory attachable to and detachable from a slot connected to the R-W 50.

The CPU 60 serves as a control processing section that controls each circuit block provided in the imaging apparatus 100. The CPU 60 controls each circuit block based on, for example, an instruction input signal from the input section 70, etc. The input section 70 is configured of components such as various switches by which necessary operations are performed by a user. The input section 70 may be configured, for example, of a shutter release button for performing a shutter operation, a selection switch for selecting operation modes, etc. The input section 70 outputs, to the CPU 60, an instruction input signal in accordance with the operation by the user. The lens drive control section 80 controls driving of lenses arranged in the camera block 10. The lens drive control section 80 may control, for example, an unillustrated motor or the like that drives each of the lenses in the imaging lens 110 based on a control signal supplied from the CPU 60.

Description is given below of an operation in the imaging apparatus 100.

In a standby state for shooting, under control by the CPU 60, an image signal of an image shot in the camera block 10 is outputted to the LCD 40 via the camera signal processing section 20 to be displayed as a camera-through image. Further, for example, when the input section 70 inputs an instruction input signal for a focusing operation, the CPU 60 outputs a control signal to the lens drive control section 80, and predetermined one or more lenses in the imaging lens 110 travel based on the control by the lens drive control section 80.

When an unillustrated shutter of the camera block 10 operates in response to the instruction input signal supplied from the input section 70, the camera signal processing section 20 outputs the image signal of the shot image to the image processing section 30. The image processing section 30 performs a compression encoding process on the image signal and converts the image signal into digital data having a predetermined data format. The image processing section 30 outputs the converted data to the R-W 50 and the R-W 50 writes the converted data in the memory card 1000.

It is to be noted that the focusing operation is performed through allowing the predetermined one or more lenses in the imaging lens 110 to travel by the lens drive control section 80 in response to the control signal supplied from the CPU 60, for example, when the shutter release button of the input section 70 is pressed halfway, when the shutter release button is fully pressed for recording (shooting), etc.

When reproducing the image data recorded in the memory card 1000, the R-W 50 reads predetermined image data from the memory card 1000 in response to the operation with respect to the input section 70. The image processing section 30 performs an extension decoding process on the image data and outputs a reproduction image signal to the LCD 40 as a result. Thus, the reproduction image is displayed.

It is to be noted that, although the example in which the imaging apparatus is applied to a digital still camera has been described in the above embodiment, a range of applications of the imaging apparatus is not limited to digital still cameras, and other various electronic apparatuses may be the possible specific applications of the imaging apparatus 100. For example, the imaging apparatus 100 is widely applicable as a camera section of a digital input-output apparatus such as a digital video camcorder, a mobile phone provided with a camera, and a PDA (Personal Digital Assistant) provided with a camera, etc. The imaging apparatus 100 is also applicable to a camera with an interchangeable lens.

EXAMPLES

4. Numerical Examples of Lens

Next, description is given of specific numerical examples of the imaging lens according to the present embodiment. Here, description is given of numerical examples in which specific numerical values are applied to the imaging lenses 1 to 11 in the configuration examples illustrated in FIGS. 1 to 11, respectively.

Symbols etc. in tables and the description below represent the following. In each of the numerical examples, all lengths are shown in unit of millimeter and all angles of view are shown in unit of degree in the tables. "Surface No." represents the number of an i-th surface counted from the most object side. "R" represents a value (mm) of a paraxial curvature radius of the i-th surface. "D" represents a value (mm) of a spacing on the optical axis between the i-th surface and the (i+1)th surface. "Nd" represents a value of a refractive index of a d-line (having a wavelength of 587.6 nm) of a material of an optical member that has the i-th surface. "vd" represents a value of an Abbe number, with respect to the d-line, of the material of the optical member that has the i-th surface. A value of "∞" in "R" indicates that the relevant surface is a planar surface or an aperture surface (an aperture stop STO). "STO" in "Surface No." indicates that the relevant surface is the aperture stop STO. "f" represents a total focal length of the lens system. "Fno" represents an F number. "ω" represents a half angle of view. "β" represents a shooting magnification.

Some lenses used in the numerical examples have an aspherical lens surface. "*" in "Surface No." indicates that the relevant surface is aspherical. The aspherical surface has a shape that is defined by the following expression of aspherical surface. It is to be noted that, in the respective tables below showing the aspherical surface coefficients, "E-i" represents an exponential expression having 10 as a base, i.e., "$10^{-i}$". To give an example, "0.12345E-05" represents "$0.12345 \times 10^{-5}$".

(Expression of aspherical surface)

$$Z = \frac{h^2/r}{1 + \sqrt{1 - (1+\kappa)(h/r)^2}} + \sum A_n h^n$$

In the above-described expression of aspherical surface, Z is a distance from a point on an aspherical surface having a height h from the optical axis, to a tangent plane of a vertex of the aspherical surface, h is a height from the optical axis, r is a vertex curvature radius, κ is a conic constant, and An is an n-th order aspherical surface coefficient.

Configuration Common to Numerical Examples

Each of the imaging lenses 1 to 11 to which the respective numerical examples below are applied has a configuration that satisfies the above-described basic configuration of the lens and also satisfies Conditional expressions (1) to (6). Each of the imaging lenses 1 to 11 is substantially configured of three lens groups, that are, the first lens group G1 having positive refractive power, the second lens group G2 having negative refractive power, and the third lens group G3 having positive refractive power that are arranged in order from the object side. An optical member SG is arranged between the third lens group G3 and the image plane S.

The second lens group G2 serves as the focus lens group, and travels along the optical axis Z1 as illustrated by the arrows in FIGS. 1 to 11 through the focusing operation from the infinite object side toward the short-distance object side.

Numerical Example 1

In the imaging lens 1 illustrated in FIG. 1, the first lens group G1 includes, in order from the object side, a cemented lens configured of a biconcave lens L11 and a biconvex lens L12, and a cemented lens configured of a negative meniscus lens L13 that has a convex surface facing toward the object side and a positive meniscus lens L14 that has a convex surface facing toward the object side. The second lens group G2 includes a negative meniscus lens L21 that has a convex surface facing toward the object side. The third lens group G3 includes a biconvex lens L31, and a negative meniscus lens L32 that has a concave surface facing toward the object side. The aperture stop STO is arranged between the first lens group G1 and the second lens group G2.

Table 1 shows lens data of Numerical example 1 to which specific numerical values are applied to the imaging lens 1. In the imaging lens 1, the sixth and eighth to eleventh surfaces are aspherical. Table 3 shows values of 4th, 6th, 8th, and 10th aspherical coefficients A4, A6, A8, and A10 of those aspherical surfaces, together with values of conic constant κ.

Table 2 shows values of total focal length f of the lens system, of F number Fno, and of a half angle of view ω in the infinite focus state. Also, Table 2 shows values of shooting magnification β in the short-distance focus state. In the imaging lens 1, the spacings in the front and the rear of the second lens group G2 vary through the focusing operation from the infinite object side toward the short-distance object side. Table 2 also shows values of variable spacings in each of the infinite focus state and the short-distance focus state.

TABLE 1

Example 1

| Surface No. | R | D | Nd | vd |
|---|---|---|---|---|
| 1 | −46.604 | 3.78 | 1.58144 | 40.9 |
| 2 | 40.397 | 7.54 | 1.72916 | 54.7 |
| 3 | −58.437 | 0.40 | | |
| 4 | 32.361 | 1.60 | 1.846663 | 23.8 |
| 5 | 23.982 | 5.44 | 1.768015 | 49.2 |
| 6* | 127.461 | 2.78 | | |
| 7(STO) | ∞ | D7 | | |
| 8* | 229.883 | 1.00 | 1.487489 | 70.4 |
| 9* | 21.728 | D9 | | |
| 10* | 43.205 | 12.00 | 1.592014 | 67.0 |
| 11* | −44.134 | 12.35 | | |

TABLE 1-continued

Example 1

| Surface No. | R | D | Nd | vd |
|---|---|---|---|---|
| 12 | −18.057 | 1.20 | 1.69895 | 30.1 |
| 13 | −39.016 | 11.78 | | |
| 14 | ∞ | 2.00 | 1.516798 | 64.2 |
| 15 | ∞ | 1.00 | | |
| Image | ∞ | | | |

TABLE 2

Example 1

| | Infinite focus state | Short-distance focus state |
|---|---|---|
| Fno | 1.86 | — |
| f | 53.61 | — |
| ω | 22.15 | — |
| β | 0 | −0.033 |
| D7 | 2.81 | 4.07 |
| D9 | 13.67 | 12.41 |

TABLE 3

Example 1

| Surface No. | κ | A4 | A6 |
|---|---|---|---|
| 6 | 0.00000E+00 | 0.472026E−05 | −0.613511E−08 |
| 8 | 0.00000E+00 | −0.153071E−04 | 0.595902E−07 |
| 9 | 0.00000E+00 | −0.166843E−04 | 0.520407E−07 |
| 10 | 0.00000E+00 | 0.458950E−05 | −0.129121E−07 |
| 11 | 0.00000E+00 | −0.328037E−05 | −0.272677E−07 |

| Surface No. | A8 | A10 |
|---|---|---|
| 6 | 0.319538E−10 | −0.508717E−13 |
| 8 | −0.103151E−09 | −0.118635E−12 |
| 9 | 0.377076E−11 | −0.666338E−12 |
| 10 | 0.703681E−10 | −0.607907E−12 |
| 11 | 0.931069E−10 | −0.599753E−12 |

Numerical Example 2

Figure 2:
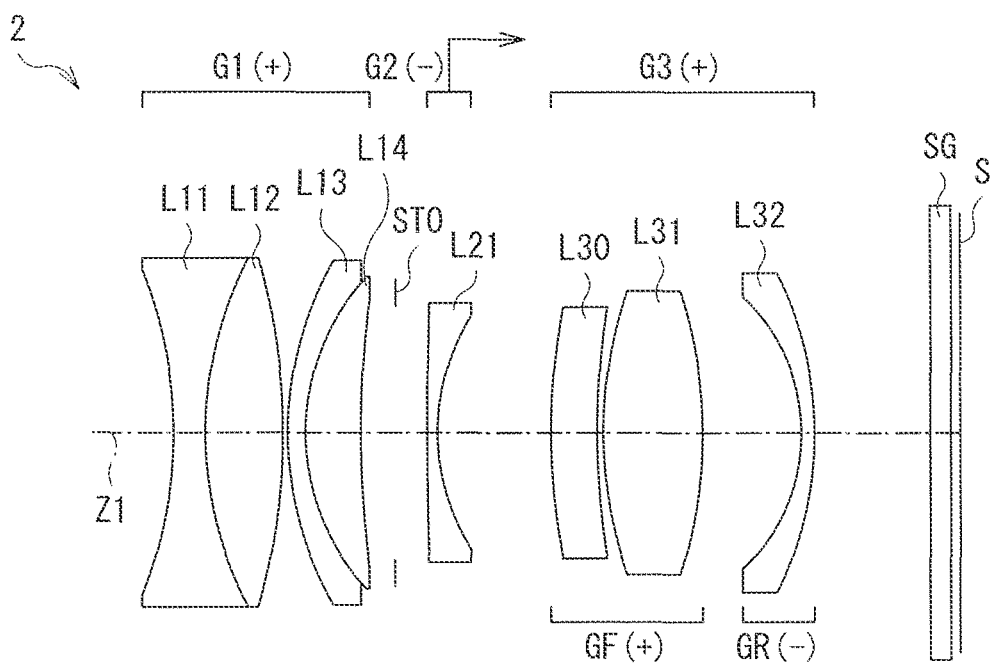
FIG. 2 is a lens cross-sectional view illustrating a second configuration example of the imaging lens.

In the imaging lens 2 illustrated in FIG. 2, the first lens group G1 includes, in order from the object side, a cemented lens configured of a biconcave lens L11 and a biconvex lens L12, and a cemented lens configured of a negative meniscus lens L13 that has a convex surface facing toward the object side and a positive meniscus lens L14 that has a convex surface facing toward the object side. The second lens group G2 includes a negative meniscus lens L21 that has a convex surface facing toward the object side. The third lens group G3 includes a negative meniscus lens L30 that has a convex surface facing toward the object side and has weak refractive power, a biconvex lens L31, and a negative meniscus lens L32 that has a concave surface facing toward the object side. The aperture stop STO is arranged between the first lens group G1 and the second lens group G2.

Table 4 shows lens data of Numerical example 2 to which specific numerical values are applied to the imaging lens 2. In the imaging lens 2, the sixth and eighth to eleventh surfaces are aspherical. Table 6 shows values of 4th, 6th, 8th, and 10th aspherical coefficients A4, A6, A8, and A10 of those aspherical surfaces, together with values of conic constant κ.

Table 5 shows values of total focal length f of the lens system, of F number Fno, and of a half angle of view ω in the infinite focus state. Also, Table 5 shows values of shooting magnification β in the short-distance focus state. In the imaging lens 2, the spacings in the front and the rear of the second lens group G2 vary through the focusing operation from the infinite object side toward the short-distance object side. Table 5 also shows values of variable spacings in each of the infinite focus state and the short-distance focus state.

TABLE 4

Example 2

| Surface No. | R | D | Nd | vd |
|---|---|---|---|---|
| 1 | −43.053 | 3.08 | 1.581440 | 40.9 |
| 2 | 37.418 | 8.02 | 1.729160 | 54.7 |
| 3 | −55.490 | 0.40 | | |
| 4 | 35.214 | 1.80 | 1.740770 | 27.8 |
| 5 | 22.739 | 5.52 | 1.772501 | 49.5 |
| 6* | 163.860 | 3.50 | | |
| 7(STO) | ∞ | D7 | | |
| 8* | 170.589 | 1.00 | 1.487489 | 70.4 |
| 9* | 20.602 | D9 | | |
| 10* | 55.812 | 4.57 | 1.583130 | 59.5 |
| 11* | 49.021 | 0.77 | | |
| 12 | 45.288 | 10.00 | 1.696802 | 55.5 |
| 13 | −47.014 | 10.03 | | |
| 14 | −18.854 | 1.20 | 1.846663 | 23.8 |
| 15 | −35.051 | 11.68 | | |
| 16 | ∞ | 2.00 | 1.516798 | 64.2 |
| 17 | ∞ | 1.00 | | |
| Image | ∞ | | | |

TABLE 5

Example 2

| | Infinite focus state | Short-distance focus state |
|---|---|---|
| Fno | 1.85 | — |
| f | 52.18 | — |
| ω | 22.81 | — |
| β | 0 | −0.033 |
| D7 | 3.20 | 4.45 |
| D9 | 11.44 | 10.19 |

TABLE 6

Example 2

| Surface No. | κ | A4 | A6 |
|---|---|---|---|
| 6 | 0.00000E+00 | 0.508908E−05 | −0.787859E−08 |
| 8 | 0.00000E+00 | −0.197380E−04 | 0.969186E−07 |
| 9 | 0.00000E+00 | −0.221576E−04 | 0.872900E−07 |
| 10 | 0.00000E+00 | −0.538071E−05 | −0.291411E−07 |
| 11 | 0.00000E+00 | −0.158052E−04 | −0.381825E−07 |

| Surface No. | A8 | A10 |
|---|---|---|
| 6 | 0.437616E−10 | −0.738330E−13 |
| 8 | −0.252021E−09 | 0.00000E+00 |
| 9 | −0.103567E−09 | −0.912021E−12 |

TABLE 6-continued

| | Example 2 | |
|---|---|---|
| 10 | 0.233914E−09 | −0.123731E−11 |
| 11 | 0.159168E−09 | −0.904960E−12 |

Numerical Example 3

Figure 3:
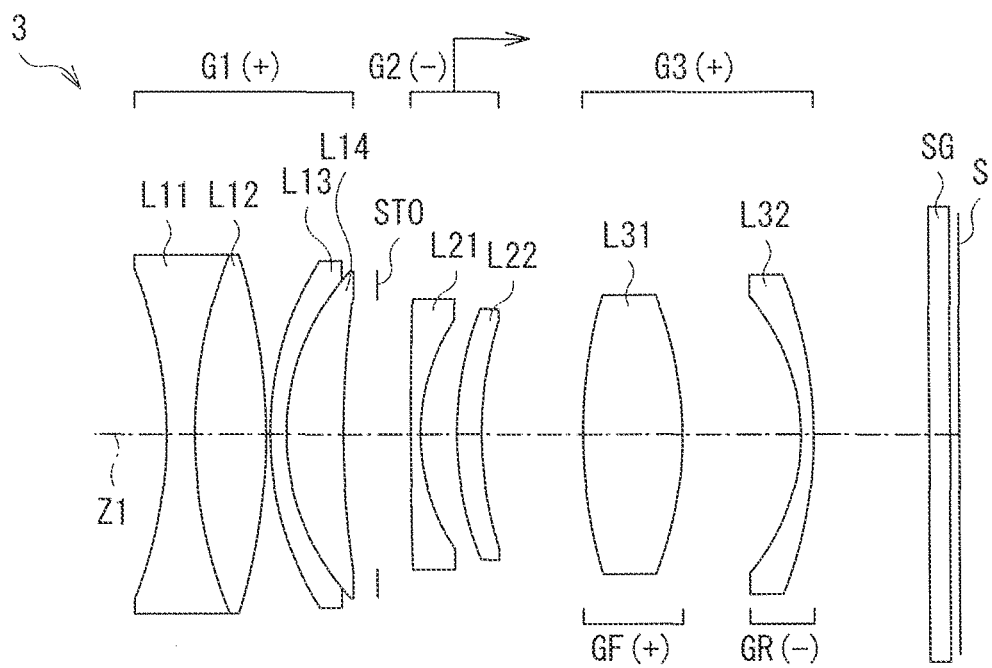
FIG. 3 is a lens cross-sectional view illustrating a third configuration example of the imaging lens.

In the imaging lens 3 illustrated in FIG. 3, the first lens group G1 includes, in order from the object side, a cemented lens configured of a biconcave lens L11 and a biconvex lens L12, and a cemented lens configured of a negative meniscus lens L13 that has a convex surface facing toward the object side and a positive meniscus lens L14 that has a convex surface facing towards the object side. The second lens group G2 includes a negative meniscus lens L21 that has a convex surface facing toward the object side, and a positive meniscus lens L22 that has a convex surface facing toward the object side. The third lens group G3 includes a biconvex lens L31, and a negative meniscus lens L32 that has a concave surface facing toward the object side. The aperture stop STO is arranged between the first lens group G1 and the second lens group G2.

Table 7 shows lens data of Numerical example 3 to which specific numerical values are applied to the imaging lens 3. In Numerical example 3, the sixth, eighth, ninth, twelfth, and thirteenth surfaces are aspherical. Table 9 shows values of 4th, 6th, 8th, and 10th aspherical coefficients A4, A6, A8, and A10 of those aspherical surfaces, together with values of conic constant κ.

Table 8 shows values of total focal length f of the lens system, of F number Fno, and of a half angle of view ω in the infinite focus state. Also, Table 8 shows values of shooting magnification β in the short-distance focus state. In the imaging lens 3, the spacings in the front and the rear of the second lens group G2 vary through the focusing operation from the infinite object side toward the short-distance object side. Table 8 also shows values of variable spacings in each of the infinite focus state and the short-distance focus state.

TABLE 7

| | Example 3 | | | |
|---|---|---|---|---|
| Surface No. | R | D | Nd | vd |
| 1 | −44.195 | 2.79 | 1.647690 | 33.8 |
| 2 | 45.156 | 7.36 | 1.804200 | 46.5 |
| 3 | −55.531 | 0.40 | | |
| 4 | 32.741 | 1.60 | 1.846663 | 23.8 |
| 5 | 23.041 | 5.78 | 1.772501 | 49.5 |
| 6* | 141.877 | 3.50 | | |
| 7(STO) | ∞ | D7 | | |
| 8* | 288.225 | 1.00 | 1.589130 | 61.3 |
| 9* | 20.502 | 3.48 | | |
| 10 | 32.121 | 2.56 | 1.945945 | 18.0 |
| 11 | 38.580 | D11 | | |
| 12* | 50.570 | 10.00 | 1.618806 | 63.9 |
| 13* | −40.060 | 12.08 | | |
| 14 | −20.507 | 1.20 | 1.922860 | 20.9 |
| 15 | −39.587 | 11.61 | | |

TABLE 7-continued

| | Example 3 | | | |
|---|---|---|---|---|
| Surface No. | R | D | Nd | vd |
| 16 | ∞ | 2.00 | 1.516798 | 64.2 |
| 17 | ∞ | 1.00 | | |
| Image | ∞ | | | |

TABLE 8

| | Example 3 | |
|---|---|---|
| | Infinite focus state | Short-distance focus state |
| Fno | 1.85 | — |
| f | 55.01 | — |
| ω | 21.53 | — |
| β | 0 | −0.033 |
| D7 | 3.40 | 4.63 |
| D11 | 10.23 | 9.00 |

TABLE 9

| | Example 3 | | |
|---|---|---|---|
| Surface No. | κ | A4 | A6 |
| 6 | 0.00000E+00 | 0.433072E−05 | −0.488693E−08 |
| 8 | 0.00000E+00 | −0.837600E−05 | 0.275129E−07 |
| 9 | 0.00000E+00 | −0.117002E−04 | 0.297673E−07 |
| 12 | 0.00000E+00 | 0.299609E−05 | −0.194234E−07 |
| 13 | 0.00000E+00 | −0.136175E−05 | −0.443648E−07 |

| Surface No. | A8 | A10 |
|---|---|---|
| 6 | 0.262169E−10 | −0.408685E−13 |
| 8 | −0.452202E−10 | −0.314848E−13 |
| 9 | −0.119407E−09 | 0.162932E−12 |
| 12 | 0.108119E−09 | −0.631321E−12 |
| 13 | 0.216698E−09 | −0.793153E−12 |

Numerical Example 4

Figure 4:
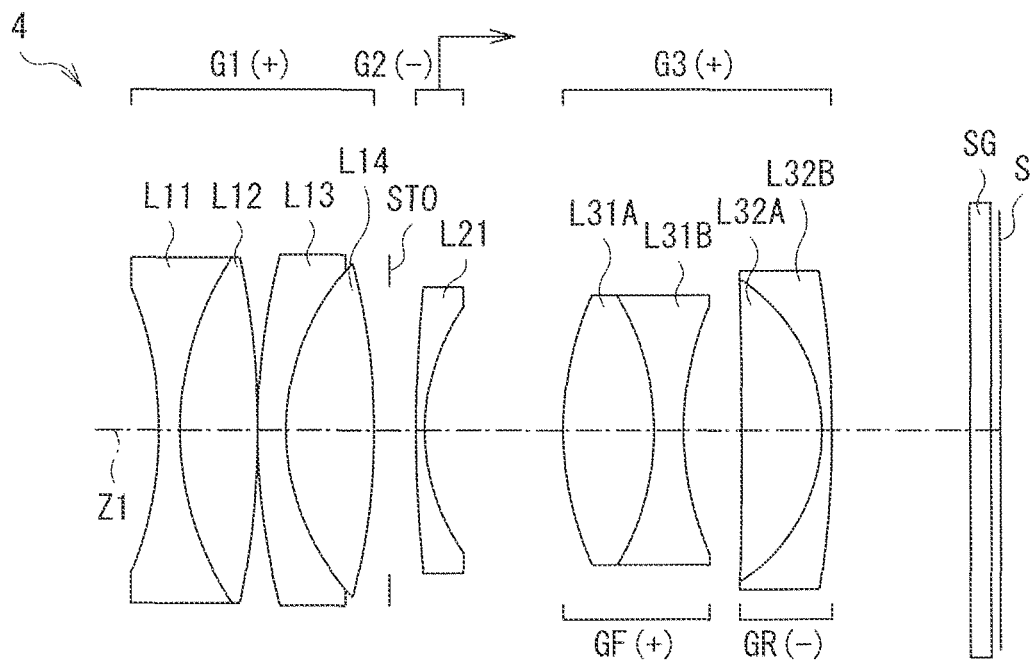
FIG. 4 is a lens cross-sectional view illustrating a fourth configuration example of the imaging lens.

In the imaging lens 4 illustrated in FIG. 4, the first lens group G1 includes, in order from the object side, a cemented lens configured of a biconcave lens L11 and a biconvex lens L12, and a cemented lens configured of a negative meniscus lens L13 that has a convex surface facing toward the object side and a biconvex lens L14. The second lens group G2 includes a negative meniscus lens L21 that has a concave surface facing toward the image side. The third lens group G3 includes a cemented lens configured of a biconvex lens L31A and a biconcave lens L31B, and a cemented lens configured of a positive meniscus lens L32A that has a convex surface facing toward the image side and a negative meniscus lens L32B that has a concave surface facing toward the object side. The aperture stop STO is arranged between the first lens group G1 and the second lens group G2.

Table 10 shows lens data of Numerical example 4 to which specific numerical values are applied to the imaging lens 4. In Numerical example 4, the fourth and thirteenth surfaces are aspherical. Table 12 shows values of 4th, 6th, 8th, and 10th aspherical coefficients A4, A6, A8, and A10 of those aspherical surfaces, together with values of conic constant κ.

Table 11 shows values of total focal length f of the lens system, of F number Fno, and of a half angle of view ω in the infinite focus state. Also, Table 11 shows values of shooting magnification β in the short-distance focus state. In the imaging lens 4, the spacings in the front and the rear of the second lens group G2 vary through the focusing operation from the infinite object side toward the short-distance object side. Table 11 also shows values of variable spacings in each of the infinite focus state and the short-distance focus state.

TABLE 10

Example 4

| Surface No. | R | D | Nd | νd |
|---|---|---|---|---|
| 1 | −36.469 | 2.26 | 1.592703 | 35.4 |
| 2 | 30.379 | 7.77 | 1.729160 | 54.7 |
| 3 | −88.171 | 0.10 | | |
| 4* | 52.935 | 2.86 | 1.622625 | 58.2 |
| 5 | 24.180 | 8.79 | 1.713000 | 53.9 |
| 6 | −68.484 | 1.71 | | |
| 7(STO) | ∞ | D7 | | |
| 8 | 113.936 | 1.00 | 1.496997 | 81.6 |
| 9 | 21.897 | D9 | | |
| 10 | 33.938 | 8.97 | 1.804200 | 46.5 |
| 11 | −27.291 | 3.11 | 1.567320 | 42.8 |
| 12 | 31.535 | 5.86 | | |
| 13* | 341.460 | 8.00 | 1.497103 | 81.6 |
| 14 | −18.190 | 1.00 | 1.806099 | 33.3 |
| 15 | −122.488 | 14.00 | | |
| 16 | ∞ | 2.00 | 1.516798 | 64.2 |
| 17 | ∞ | 1.00 | | |
| Image | ∞ | | | |

TABLE 11

Example 4

| | Infinite focus state | Short-distance focus state |
|---|---|---|
| Fno | 1.86 | — |
| f | 53.3984 | — |
| ω | 22.3275 | — |
| β | 0 | −0.033 |
| D7 | 2.49 | 3.85 |
| D9 | 14.07 | 12.71 |

TABLE 12

Example 4

| Surface No. | κ | A4 | A6 |
|---|---|---|---|
| 4 | 0.00000E+00 | −0.688428E−05 | −0.617691E−08 |
| 13 | 0.00000E+00 | −0.580852E−05 | 0.821675E−08 |

| Surface No. | A8 | A10 |
|---|---|---|
| 4 | 0.807853E−11 | −0.197496E−13 |
| 13 | −0.573313E−10 | −0.289049E−12 |

Numerical Example 5

Figure 5:
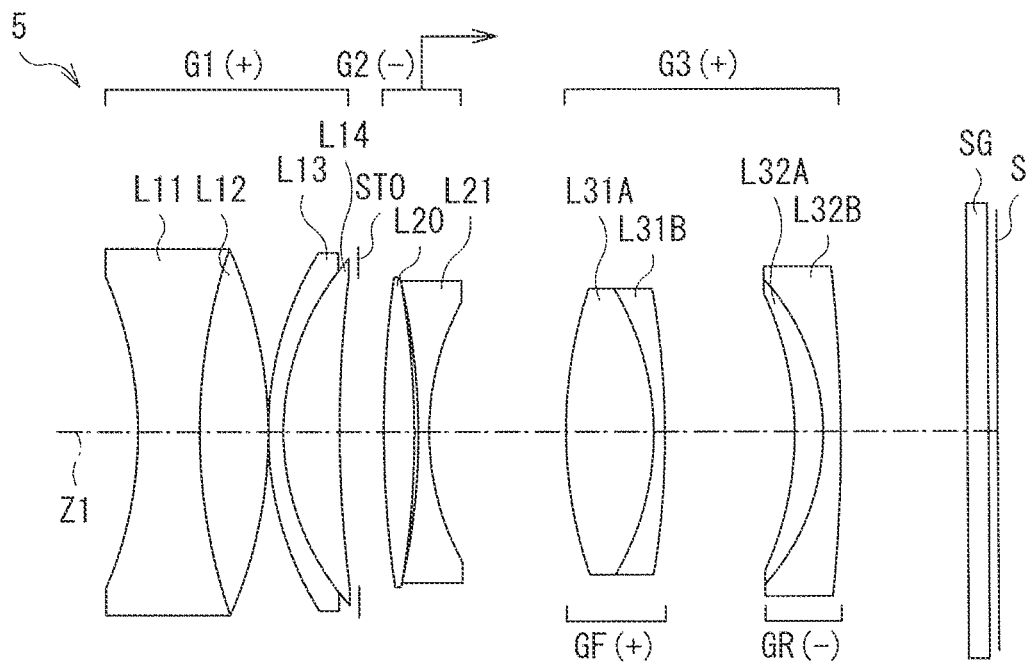
FIG. 5 is a lens cross-sectional view illustrating a fifth configuration example of the imaging lens.

In the imaging lens 5 illustrated in FIG. 5, the first lens group G1 includes, in order from the object side, a cemented lens configured of a biconcave lens L11 and a biconvex lens L12, and a cemented lens configured of a negative meniscus lens L13 that has a convex surface facing toward the object side and a positive meniscus lens L14 that has a convex surface facing toward the object side. The second lens group G2 includes a biconvex lens L20 and a biconcave lens L21. The third lens group G3 includes a cemented lens configured of a biconvex lens L31A and a negative meniscus lens L31B that has a concave surface facing toward the object side, and a cemented lens configured of a positive meniscus lens L32A that has a concave surface facing toward the object side and a negative meniscus lens L32B that has a concave surface facing toward the object side. The aperture stop STO is arranged between the first lens group G1 and the second lens group G2.

Table 13 shows lens data of Numerical example 5 to which specific numerical values are applied to the imaging lens 5. In Numerical example 5, the sixth, twelfth, and fifteenth surfaces are aspherical. Table 15 shows values of 4th, 6th, 8th, and 10th aspherical coefficients A4, A6, A8, and A10 of those aspherical surfaces, together with values of conic constant κ.

Table 14 shows values of total focal length f of the lens system, of F number Fno, and of a half angle of view ω in the infinite focus state. Also, Table 14 shows values of shooting magnification β in the short-distance focus state. In the imaging lens 5, the spacings in the front and the rear of the second lens group G2 vary through the focusing operation from the infinite object side toward the short-distance object side. Table 14 also shows values of variable spacings in each of the infinite focus state and the short-distance focus state.

TABLE 13

Example 5

| Surface No. | R | D | Nd | νd |
|---|---|---|---|---|
| 1 | −38.021 | 6.24 | 1.672700 | 32.2 |
| 2 | 57.190 | 6.84 | 1.729160 | 54.7 |
| 3 | −44.739 | 0.10 | | |
| 4 | 33.861 | 1.50 | 1.698950 | 30.1 |
| 5 | 25.498 | 5.65 | 1.290300 | 54.0 |
| 6* | 170.283 | 1.94 | | |
| 7(STO) | ∞ | D7 | | |
| 8 | 117.673 | 3.19 | 1.752110 | 25.0 |
| 9 | −74.188 | 0.39 | | |
| 10 | −62.658 | 1.00 | 1.713000 | 53.9 |
| 11 | 27.032 | D11 | | |
| 12* | 44.768 | 8.92 | 1.729030 | 54.0 |
| 13 | −28.244 | 1.20 | 1.620040 | 36.3 |
| 14 | −86.588 | 13.08 | | |
| 15* | −40.731 | 2.88 | 1.497103 | 81.6 |
| 16 | −23.293 | 1.80 | 1.752110 | 25.0 |
| 17 | −162.600 | 12.90 | | |
| 18 | ∞ | 2.00 | 1.516798 | 64.2 |
| 19 | ∞ | 1.00 | | |
| Image | ∞ | | | |

TABLE 14

Example 5

| | Infinite focus state | Short-distance focus state |
|---|---|---|
| Fno | 1.8 | — |
| f | 53.45 | — |
| ω | 22.42 | — |
| β | 0 | −0.033 |
| D7 | 2.60 | 4.15 |
| D11 | 13.77 | 12.22 |

TABLE 15

Example 5

| Surface No. | κ | A4 | A6 |
|---|---|---|---|
| 6 | 0.00000E+00 | 0.357821E−05 | −0.692532E−09 |
| 12 | 0.00000E+00 | 0.282834E−05 | 0.378523E−08 |
| 15 | 0.00000E+00 | −0.159405E−04 | 0.296768E−07 |

| Surface No. | A8 | A10 |
|---|---|---|
| 6 | 0.293854E−11 | −0.523885E−14 |
| 12 | −0.196233E−10 | 0.368245E−13 |
| 15 | −0.217000E−09 | 0.330691E−12 |

Numerical Example 6

Figure 6:
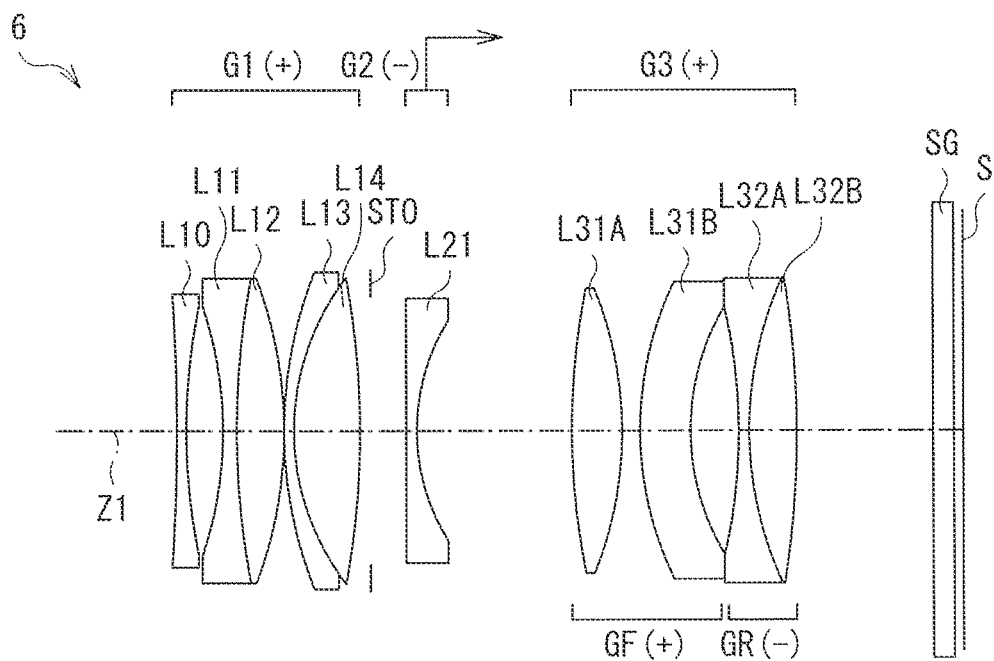
FIG. 6 is a lens cross-sectional view illustrating a sixth configuration example of the imaging lens.

In the imaging lens 6 illustrated in FIG. 6, the first lens group G1 includes, in order from the object side, a biconcave lens L10, a cemented lens configured of a biconcave lens L11 and a biconvex lens L12, and a cemented lens configured of a negative meniscus lens L13 that has a convex surface facing toward the object side and a biconvex lens 14. The second lens group G2 includes a negative meniscus lens L21 that has a concave surface facing toward the image side. The third lens group G3 includes a biconvex lens L31A, a negative meniscus lens L31B that has a convex surface facing toward the object side, and a cemented lens configured of a biconcave lens L32A and a biconvex lens L32B. The aperture stop STO is arranged between the first lens group G1 and the second lens group G2.

Table 16 shows lens data of Numerical example 6 to which specific numerical values are applied to the imaging lens 6. In Numerical example 6, the first, eighth, twelfth, and thirteenth surfaces are aspherical. Table 18 shows values of 4th, 6th, 8th, and 10th aspherical coefficients A4, A6, A8, and A10 of those aspherical surfaces, together with values of conic constant κ.

Table 17 shows values of total focal length f of the lens system, of F number Fno, and of a half angle of view ω in the infinite focus state. Also, Table 17 shows values of shooting magnification β in the short-distance focus state. In the imaging lens 6, the spacings in the front and the rear of the second lens group G2 vary through the focusing operation from the infinite object side toward the short-distance object side. Table 17 also shows values of variable spacings in each of the infinite focus state and the short-distance focus state.

TABLE 16

Example 6

| Surface No. | R | D | Nd | vd |
|---|---|---|---|---|
| 1* | 2222.850 | 1.00 | 1.743300 | 49.3 |
| 2 | 75.242 | 3.58 | | |
| 3 | −41.570 | 1.43 | 1.752110 | 25.0 |
| 4 | 76.896 | 4.79 | 1.910822 | 35.3 |
| 5 | −41.793 | 0.10 | | |
| 6 | 42.193 | 1.00 | 1.672700 | 32.2 |
| 7 | 25.731 | 6.75 | 1.729030 | 54.0 |
| 8* | −84.678 | 1.00 | | |
| 9(STO) | ∞ | D9 | | |
| 10 | 1136.621 | 1.00 | 1.496997 | 81.6 |
| 11 | 20.997 | D11 | | |
| 12* | 59.669 | 5.00 | 1.729030 | 54.0 |
| 13* | −41.511 | 1.92 | | |
| 14 | 33.735 | 5.00 | 2.001000 | 29.1 |
| 15 | 25.035 | 4.85 | | |
| 16 | −59.230 | 1.00 | 1.698950 | 30.1 |
| 17 | 34.704 | 4.83 | 1.496997 | 81.6 |
| 18 | −108.470 | 13.89 | | |
| 19 | ∞ | 2.00 | 1.516798 | 64.2 |
| 20 | ∞ | 1.00 | | |
| Image | ∞ | | | |

TABLE 17

Example 6

| | Infinite focus state | Short-distance focus state |
|---|---|---|
| Fno | 1.85 | — |
| f | 46.35 | — |
| ω | 25.29 | — |
| β | 0 | −0.033 |
| D9 | 3.50 | 4.49 |
| D11 | 15.76 | 14.77 |

TABLE 18

Example 6

| Surface No. | κ | A4 | A6 |
|---|---|---|---|
| 1 | 0.00000E+00 | −0.127634E−04 | −0.619379E−08 |
| 8 | 0.00000E+00 | −0.306369E−05 | 0.558394E−08 |
| 12 | 0.00000E+00 | −0.342776E−05 | −0.106471E−07 |
| 13 | 0.00000E+00 | 0.980429E−06 | −0.222406E−07 |

| Surface No. | A8 | A10 |
|---|---|---|
| 1 | 0.659861E−11 | 0.280000E−13 |
| 8 | 0.437443E−11 | −0.735666E−14 |
| 12 | 0.582910E−10 | −0.219697E−12 |
| 13 | 0.106206E−09 | −0.339691E−12 |

Numerical Example 7

Figure 7:
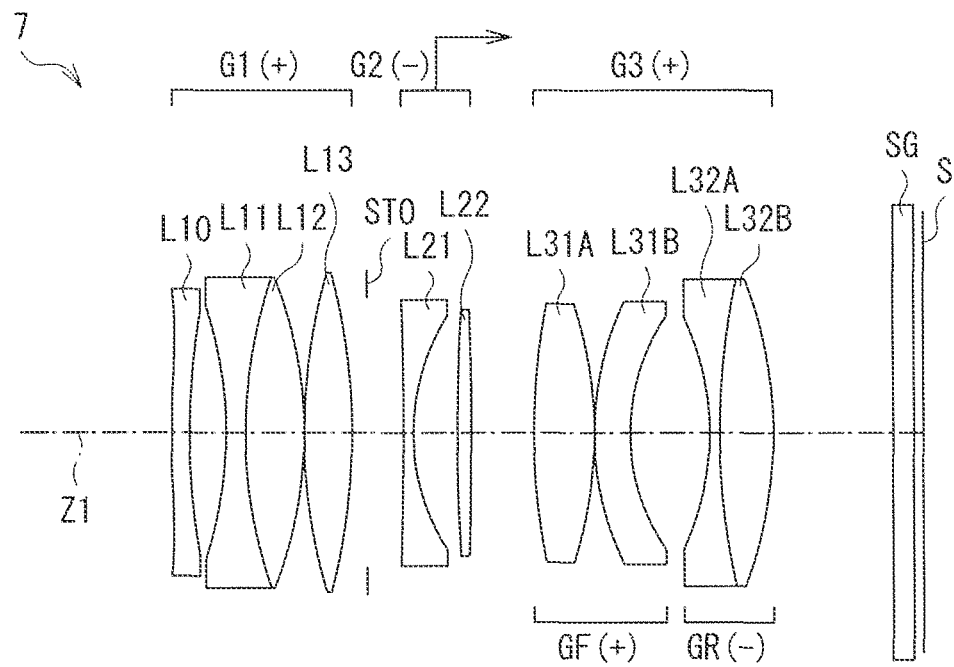
FIG. 7 is a lens cross-sectional view illustrating a seventh configuration example of the imaging lens.

In the imaging lens 7 illustrated in FIG. 7, the first lens group G1 includes, in order from the object side, a negative meniscus lens L10 that has a concave surface facing toward the image side, a cemented lens configured of a biconcave lens L11 and a biconvex lens L12, and a biconvex lens L13. The second lens group G2 includes a negative meniscus lens L21 that has a concave surface facing toward the image side, and a biconvex lens L22. The third lens group G3 includes a biconvex lens L31A, a negative meniscus lens L31B that has a convex surface facing toward the object side, and a cemented lens configured of a biconcave lens L32A and a biconvex lens L32B. The aperture stop STO is arranged between the first lens group G1 and the second lens group G2.

Table 19 shows lens data of Numerical example 7 to which specific numerical values are applied to the imaging lens 7. In Numerical example 7, the first, seventh, thirteenth, and fourteenth surfaces are aspherical. Table 21 shows values of 4th, 6th, 8th, and 10th aspherical coefficients A4, A6, A8, and A10 of those aspherical surfaces, together with values of conic constant κ.

Table 20 shows values of total focal length f of the lens system, of F number Fno, and of a half angle of view ω in the infinite focus state. Also, Table 20 shows values of shooting magnification β in the short-distance focus state. In the imaging lens 7, the spacings in the front and the rear of the second lens group G2 vary through the focusing operation from the infinite object side toward the short-distance object side. Table 20 also shows values of variable spacings in each of the infinite focus state and the short-distance focus state.

TABLE 19

Example 7

| Surface No. | R | D | Nd | νd |
|---|---|---|---|---|
| 1* | 138.963 | 1.73 | 1.834410 | 37.3 |
| 2 | 70.404 | 3.76 | | |
| 3 | −41.450 | 1.99 | 1.752110 | 25.0 |
| 4 | 49.054 | 5.88 | 1.883000 | 40.8 |
| 5 | −41.233 | 0.10 | | |
| 6 | 57.338 | 4.71 | 1.729030 | 54.0 |
| 7* | −67.028 | 1.50 | | |
| 8(STO) | ∞ | D8 | | |
| 9 | −244.034 | 1.00 | 1.516798 | 64.2 |
| 10 | 22.356 | 4.33 | | |
| 11 | 209.966 | 1.50 | 1.945945 | 18.0 |
| 12 | −260.965 | D12 | | |
| 13* | 72.628 | 6.00 | 1.729030 | 54.0 |
| 14* | −43.857 | 0.10 | | |
| 15 | 29.849 | 3.51 | 1.755200 | 27.5 |
| 16 | 21.082 | 8.20 | | |
| 17 | −27.839 | 1.00 | 1.752110 | 25.0 |
| 18 | 67.747 | 5.36 | 1.617998 | 63.4 |
| 19 | −44.917 | 12.20 | | |
| 20 | ∞ | 2.00 | 1.516798 | 64.2 |
| 21 | ∞ | 1.00 | | |
| Image | ∞ | | | |

TABLE 20

Example 7

| | Infinite focus state | Short-distance focus state |
|---|---|---|
| Fno | 1.85 | — |
| f | 46.19 | — |
| ω | 25.30 | — |
| β | 0 | −0.033 |
| D8 | 3.82 | 4.94 |
| D12 | 6.42 | 5.30 |

TABLE 21

Example 7

| Surface No. | κ | A4 | A6 |
|---|---|---|---|
| 1 | 0.00000E+00 | −0.145776E−04 | −0.158515E−07 |
| 7 | 0.00000E+00 | −0.325045E−05 | 0.742861E−08 |
| 13 | 0.00000E+00 | −0.515025E−06 | 0.742861E−08 |
| 14 | 0.00000E+00 | −0.192615E−05 | −0.108108E−08 |

| Surface No. | A8 | A10 |
|---|---|---|
| 1 | −0.595866E−11 | 0.611967E−13 |
| 7 | −0.879472E−10 | 0.630985E−12 |
| 13 | −0.879472E−10 | 0.630985E−12 |
| 14 | −0.596595E−10 | 0.513333E−12 |

Numerical Example 8

Figure 8:
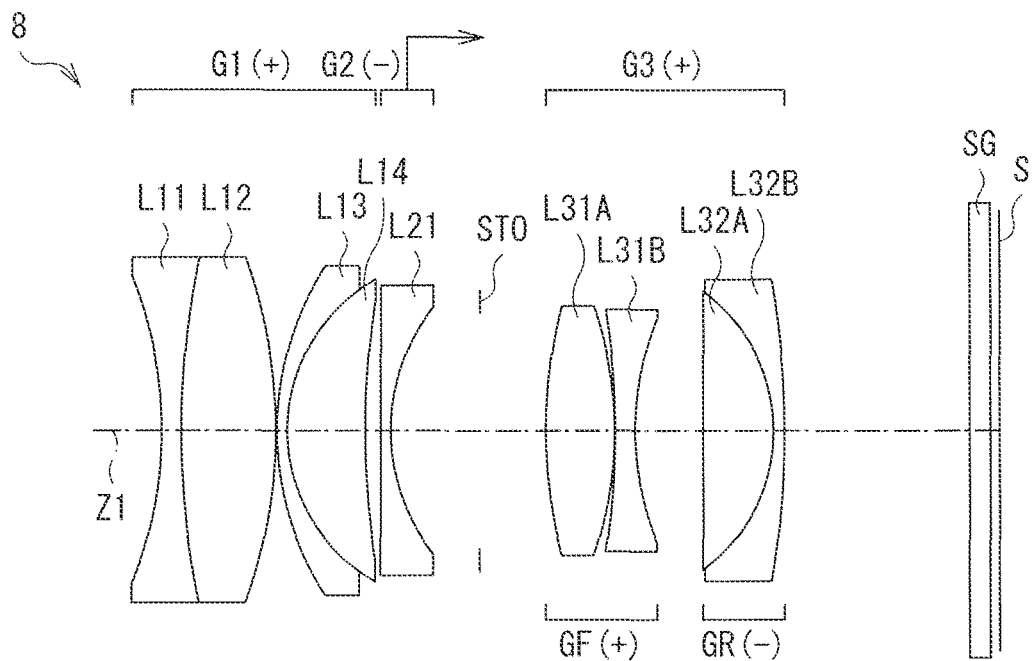
FIG. 8 is a lens cross-sectional view illustrating an eighth configuration example of the imaging lens.

In the imaging lens 8 illustrated in FIG. 8, the first lens group G1 includes, in order from the object side, a cemented lens configured of a biconcave lens L11 and a biconvex lens L12, and a cemented lens configured of a negative meniscus lens L13 that has a convex surface facing toward the object side and a positive meniscus lens L14 that has a convex surface facing toward the object side. The second lens group G2 includes a negative meniscus lens L21 that has a concave surface facing toward the image side. The third lens group G3 includes a biconvex lens L31A, a biconcave lens L31B, and a cemented lens configured of a positive meniscus lens L32A that has a convex surface facing toward the image side and a negative meniscus lens L32B that has a concave surface facing toward the object side. The aperture stop STO is arranged between the second lens group G2 and the third lens group G3.

Table 22 shows lens data of Numerical example 8 to which specific numerical values are applied to the imaging lens 8. In Numerical example 8, the sixth, eighth, tenth, and eleventh surfaces are aspherical. Table 24 shows values of 4th, 6th, 8th, and 10th aspherical coefficients A4, A6, A8, and A10 of those aspherical surfaces, together with values of conic constant κ.

Table 23 shows values of total focal length f of the lens system, of F number Fno, and of a half angle of view ω in the infinite focus state. Also, Table 23 shows values of shooting magnification β in the short-distance focus state. In the imaging lens 8, the spacings in the front and the rear of the second lens group G2 vary through the focusing operation from the infinite object side toward the short-distance object side. Table 23 also shows values of variable spacings in each of the infinite focus state and the short-distance focus state.

TABLE 22

Example 8

| Surface No. | R | D | Nd | νd |
|---|---|---|---|---|
| 1 | −43.052 | 2.07 | 1.647690 | 33.8 |
| 2 | 79.562 | 9.46 | 1.804200 | 46.5 |
| 3 | −48.817 | 0.30 | | |
| 4 | 31.166 | 1.00 | 1.698950 | 30.1 |
| 5 | 17.577 | 7.84 | 1.755014 | 51.2 |

TABLE 22-continued

Example 8

| Surface No. | R | D | Nd | vd |
|---|---|---|---|---|
| 6* | 127.515 | D6 | | |
| 7 | 20745.109 | 1.00 | 1.487489 | 70.4 |
| 8* | 20.928 | D8 | | |
| 9(STO) | ∞ | 6.50 | | |
| 10* | 49.988 | 7.00 | 1.851348 | 40.1 |
| 11* | −37.927 | 0.10 | | |
| 12 | −73.428 | 2.00 | 1.487489 | 70.4 |
| 13 | 30.083 | 7.00 | | |
| 14 | −1014.562 | 7.00 | 1.603111 | 60.7 |
| 15 | −17.500 | 1.00 | 1.805181 | 25.5 |
| 16 | −99.357 | 18.70 | | |
| 17 | ∞ | 2.00 | 1.516798 | 64.2 |
| 18 | ∞ | 1.00 | | |
| Image | ∞ | | | |

TABLE 23

Example 8

| | Infinite focus state | Short-distance focus state |
|---|---|---|
| Fno | 1.88 | — |
| f | 53.61 | — |
| ω | 21.84 | — |
| β | 0 | −0.033 |
| D6 | 1.58 | 2.49 |
| D8 | 8.96 | 8.05 |

TABLE 24

Example 8

| Surface No. | κ | A4 | A6 |
|---|---|---|---|
| 6 | 0.00000E+00 | 0.636060E−05 | −0.122877E−07 |
| 8 | 0.00000E+00 | −0.168318E−05 | 0.307543E−07 |
| 10 | 0.00000E+00 | −0.366636E−06 | 0.142927E−08 |
| 11 | 0.00000E+00 | 0.254891E−05 | −0.111423E−08 |

| Surface No. | A8 | A10 |
|---|---|---|
| 6 | 0.638834E−10 | −0.103769E−12 |
| 8 | −0.107867E−09 | 0.564967E−12 |
| 10 | −0.172870E−10 | 0.640392E−12 |
| 11 | −0.212944E−10 | 0.644435E−12 |

Numerical Example 9

Figure 9:
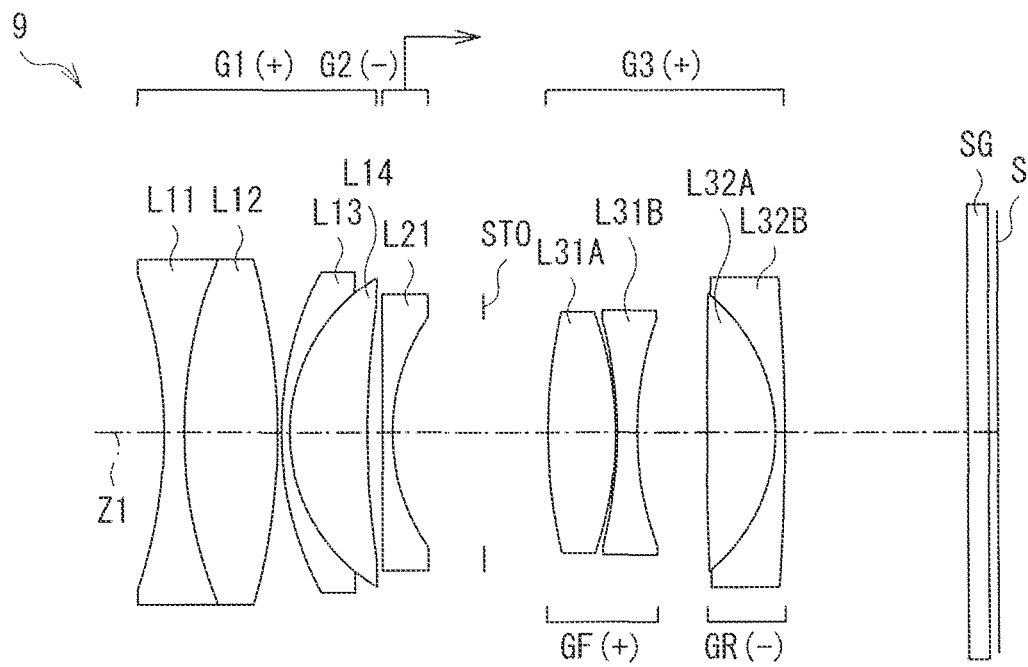
FIG. 9 is a lens cross-sectional view illustrating a ninth configuration example of the imaging lens.

In the imaging lens 9 illustrated in FIG. 9, the first lens group G1 includes, in order from the object side, a cemented lens configured of a biconcave lens L11 and a biconvex lens L12, and a cemented lens configured of a negative meniscus lens L13 that has a convex surface facing toward the object side and a positive meniscus lens L14 that has a convex surface facing toward the object side. The second lens group G2 includes a negative meniscus lens L21 that has a concave surface facing toward the image side. The third lens group G3 includes a biconvex lens L31A, a biconcave lens L31B, and a cemented lens configured of a biconvex lens L32A and a negative meniscus lens L32B that has a concave surface facing toward the object side. The aperture stop STO is arranged between the second lens group G2 and the third lens group G3.

Table 25 shows lens data of Numerical example 9 to which specific numerical values are applied to the imaging lens 9. In Numerical example 9, the sixth, eighth, tenth, and eleventh surfaces are aspherical. Table 27 shows values of 4th, 6th, 8th, and 10th aspherical coefficients A4, A6, A8, and A10 of those aspherical surfaces, together with values of conic constant κ.

Table 26 shows values of total focal length f of the lens system, of F number Fno, and of a half angle of view ω in the infinite focus state. Also, Table 26 shows values of shooting magnification β in the short-distance focus state. In the imaging lens 9, the spacings in the front and the rear of the second lens group G2 vary through the focusing operation from the infinite object side toward the short-distance object side. Table 26 also shows values of variable spacings in each of the infinite focus state and the short-distance focus state.

TABLE 25

Example 9

| Surface No. | R | D | Nd | vd |
|---|---|---|---|---|
| 1 | −52.573 | 2.07 | 1.647690 | 33.8 |
| 2 | 43.604 | 9.46 | 1.804200 | 46.5 |
| 3 | −60.717 | 0.30 | | |
| 4 | 33.327 | 1.00 | 1.698950 | 30.1 |
| 5 | 18.167 | 7.84 | 1.772501 | 49.5 |
| 6* | 114.039 | D6 | | |
| 7 | −3178.208 | 1.00 | 1.497103 | 81.6 |
| 8* | 22.185 | D8 | | |
| 9(STO) | ∞ | 6.50 | | |
| 10* | 54.219 | 7.00 | 1.851348 | 40.1 |
| 11* | −33.794 | 0.10 | | |
| 12 | −48.908 | 2.00 | 1.487489 | 70.4 |
| 13 | 35.179 | 7.00 | | |
| 14 | 387.823 | 7.00 | 1.603111 | 60.7 |
| 15 | −18.000 | 1.00 | 1.752110 | 25.0 |
| 16 | −207.854 | 18.48 | | |
| 17 | ∞ | 2.00 | 1.516798 | 64.2 |
| 18 | ∞ | 1.00 | | |
| Image | ∞ | | | |

TABLE 26

Example 9

| | Infinite focus state | Short-distance focus state |
|---|---|---|
| Fno | 1.88 | — |
| f | 53.54 | — |
| ω | 21.92 | — |
| β | 0 | −0.033 |
| D6 | 1.65 | 2.67 |
| D8 | 9.09 | 8.08 |

TABLE 27

Example 9

| Surface No. | κ | A4 | A6 |
|---|---|---|---|
| 6 | 0.00000E+00 | 0.581455E−05 | −0.844455E−08 |
| 8 | 0.00000E+00 | −0.796957E−06 | 0.248848E−07 |

TABLE 27-continued

Example 9

| | | | |
|---|---|---|---|
| 10 | 0.00000E+00 | −0.827955E−07 | −0.459458E−09 |
| 11 | 0.00000E+00 | 0.411916E−05 | −0.379124E−08 |

| Surface No. | A8 | A10 |
|---|---|---|
| 6 | 0.544666E−10 | −0.943732E−13 |
| 8 | −0.957745E−10 | 0.576286E−12 |
| 10 | 0.558081E−11 | 0.443279E−12 |
| 11 | 0.673757E−12 | 0.457711E−12 |

Numerical Example 10

Figure 10:
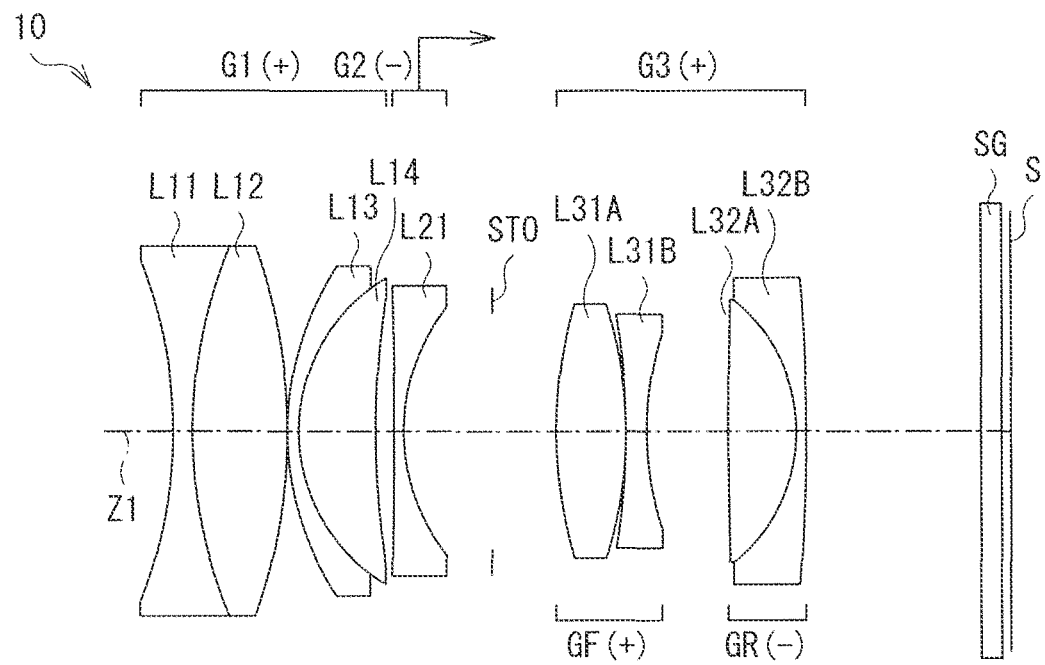
FIG. 10 is a lens cross-sectional view illustrating a tenth configuration example of the imaging lens.

In the imaging lens 10 illustrated in FIG. 10, the first lens group G1 includes, in order from the object side, a cemented lens configured of a biconcave lens L11 and a biconvex lens L12, and a cemented lens configured of a negative meniscus lens L13 that has a convex surface facing toward the object side and a positive meniscus lens L14 that has a convex surface facing toward the object side. The second lens group G2 includes a negative meniscus lens L21 that has a concave surface facing toward the image side. The third lens group G3 includes a biconvex lens L31A, a biconcave lens L31B, and a cemented lens configured of a positive meniscus lens L32A that has a convex surface facing toward the image side and a negative meniscus lens L32B that has a concave surface facing toward the object side. The aperture stop STO is arranged between the second lens group G2 and the third lens group G3.

Table 28 shows lens data of Numerical example 10 to which specific numerical values are applied to the imaging lens 10. In Numerical example 10, the sixth, eighth, tenth, and eleventh surfaces are aspherical. Table 30 shows values of 4th, 6th, 8th, and 10th aspherical coefficients A4, A6, A8, and A10 of those aspherical surfaces, together with values of conic constant κ.

Table 29 shows values of total focal length f of the lens system, of F number Fno, and of a half angle of view ω in the infinite focus state. Also, Table 29 shows values of shooting magnification β in the short-distance focus state. In the imaging lens 10, the spacings in the front and the rear of the second lens group G2 vary through the focusing operation from the infinite object side toward the short-distance object side. Table 29 also shows values of variable spacings in each of the infinite focus state and the short-distance focus state.

TABLE 28

Example 10

| Surface No. | R | D | Nd | vd |
|---|---|---|---|---|
| 1 | −49.894 | 2.07 | 1.592703 | 35.4 |
| 2 | 46.919 | 9.46 | 1.729160 | 54.7 |
| 3 | −55.110 | 0.30 | | |
| 4 | 30.404 | 1.00 | 1.698950 | 30.1 |
| 5 | 17.548 | 7.84 | 1.743300 | 49.3 |
| 6* | 138.012 | D6 | | |

TABLE 28-continued

Example 10

| Surface No. | R | D | Nd | vd |
|---|---|---|---|---|
| 7 | −407.029 | 1.00 | 1.497103 | 81.6 |
| 8* | 20.338 | D8 | | |
| 9(STO) | ∞ | 6.50 | | |
| 10* | 48.467 | 7.00 | 1.882023 | 37.2 |
| 11* | −37.904 | 0.10 | | |
| 12 | −56.509 | 2.00 | 1.518230 | 59.0 |
| 13 | 34.503 | 8.16 | | |
| 14 | 259.503 | 7.00 | 1.603111 | 60.7 |
| 15 | −16.547 | 1.00 | 1.752110 | 25.0 |
| 16 | −176.821 | 17.42 | | |
| 17 | ∞ | 2.00 | 1.516798 | 64.2 |
| 18 | ∞ | 1.00 | | |
| 19 | ∞ | | | |

TABLE 29

Example 10

| | Infinite focus state | Short-distance focus state |
|---|---|---|
| Fno | 1.8303 | — |
| f | 53.32 | — |
| ω | 21.99 | — |
| β | 0 | −0.033 |
| D6 | 1.7496 | 2.6314 |
| D8 | 8.8007 | 7.9189 |

TABLE 30

Example 10

| Surface No. | κ | A4 | A6 |
|---|---|---|---|
| 6 | 0.00000E+00 | 0.712187E−05 | −0.170635E−07 |
| 8 | 0.00000E+00 | −0.453262E−05 | 0.407566E−07 |
| 10 | 0.00000E+00 | 0.121333E−05 | 0.139809E−07 |
| 11 | 0.00000E+00 | 0.376413E−05 | 0.819974E−08 |

| Surface No. | A8 | A10 |
|---|---|---|
| 6 | 0.796207E−10 | −0.127256E−12 |
| 8 | −0.183308E−09 | 0.586949E−12 |
| 10 | −0.843583E−10 | 0.895908E−12 |
| 11 | −0.711489E−10 | 0.861844E−12 |

Numerical Example 11

Figure 11:
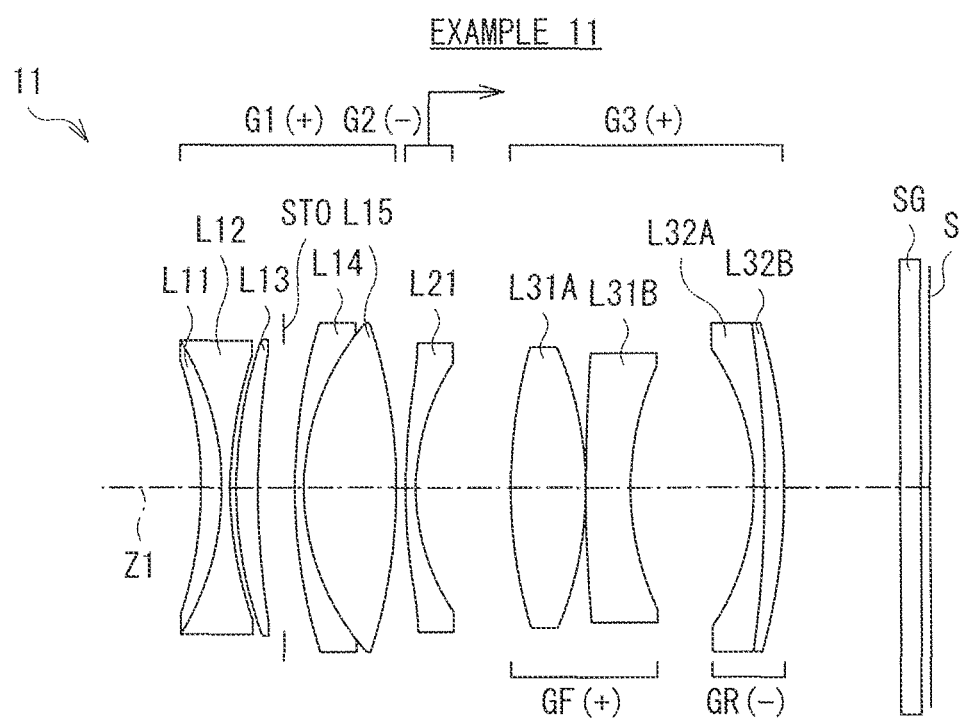
FIG. 11 is a lens cross-sectional view illustrating an eleventh configuration example of the imaging lens.
Figure 12:
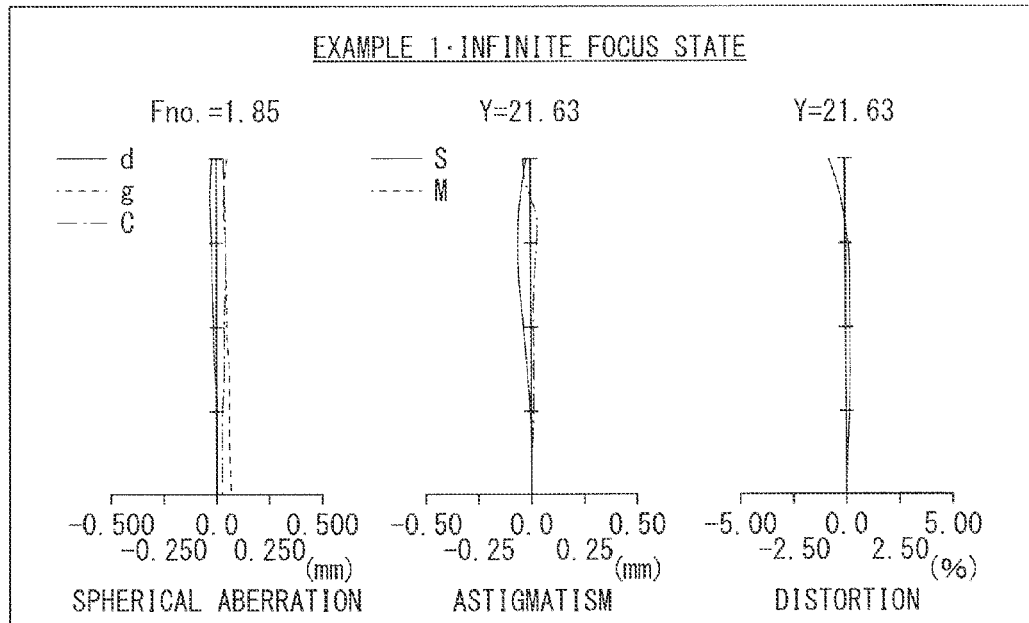
FIG. 12 is an aberration diagram showing various aberrations, in an infinite focus state, of an imaging lens in Numerical example 1 in which specific numerical values are applied to the imaging lens illustrated in FIG. 1.
Figure 13:
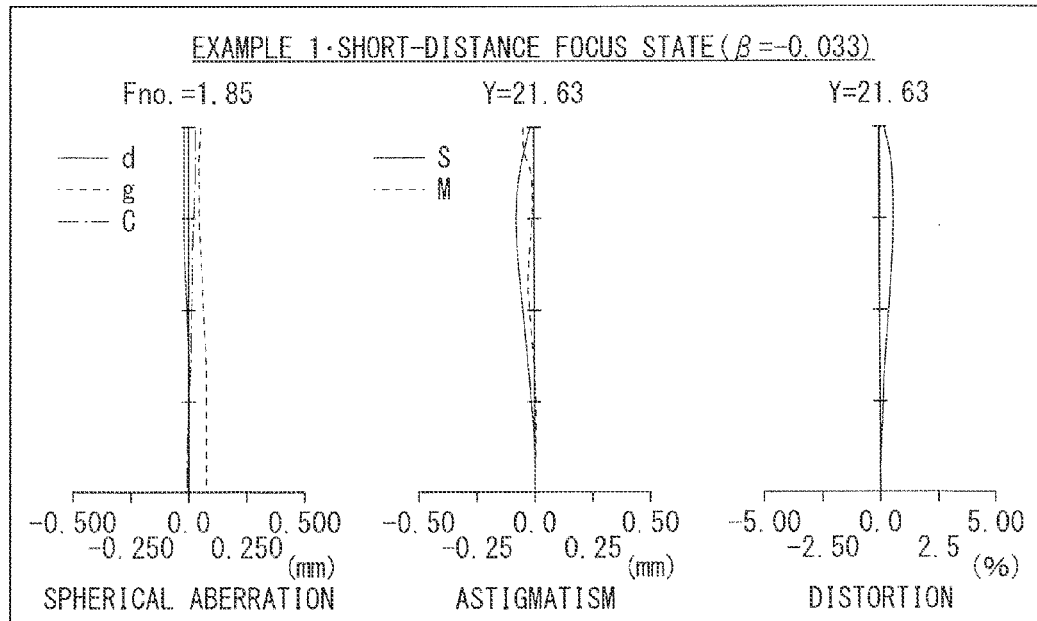
FIG. 13 is an aberration diagram showing various aberrations, in a short-distance focus state ($\beta=-0.033$), of the imaging lens in Numerical example 1 in which specific numerical values are applied to the imaging lens illustrated in FIG. 1.
Figure 14:
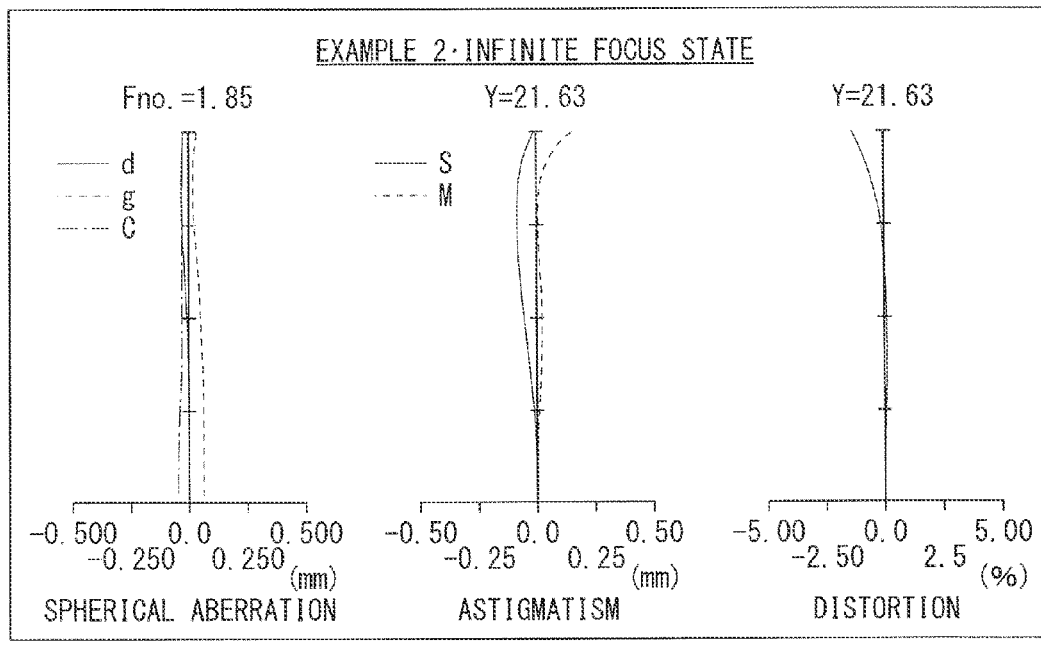
FIG. 14 is an aberration diagram showing various aberrations, in an infinite focus state, of an imaging lens in Numerical example 2 in which specific numerical values are applied to the imaging lens illustrated in FIG. 2.
Figure 15:
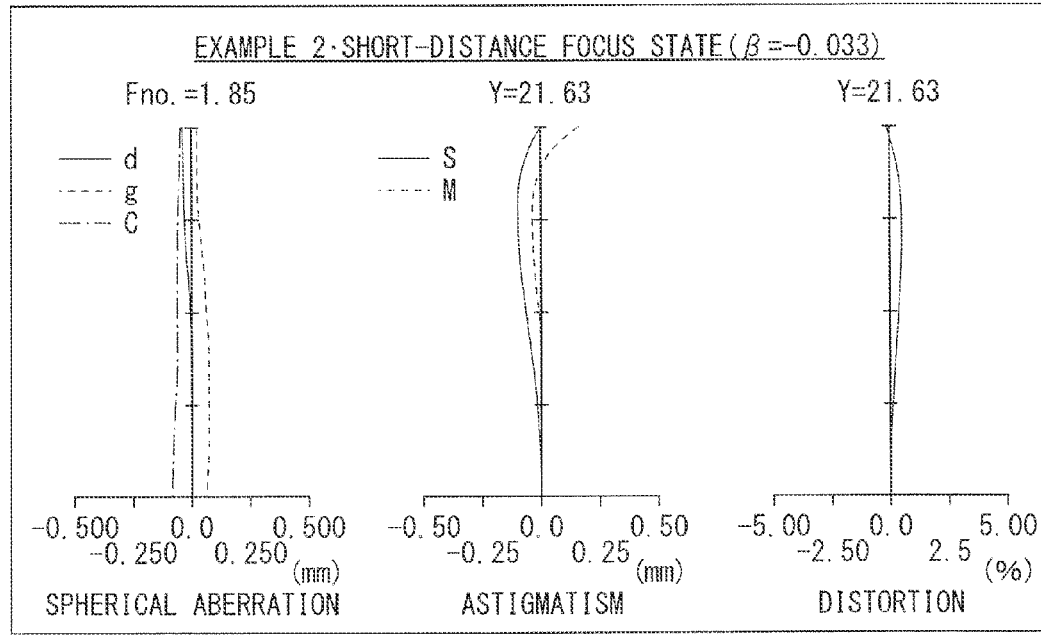
FIG. 15 is an aberration diagram showing various aberrations, in a short-distance focus state ($\beta=-0.033$), of the imaging lens in Numerical example 2 in which specific numerical values are applied to the imaging lens illustrated in FIG. 2.
Figure 16:
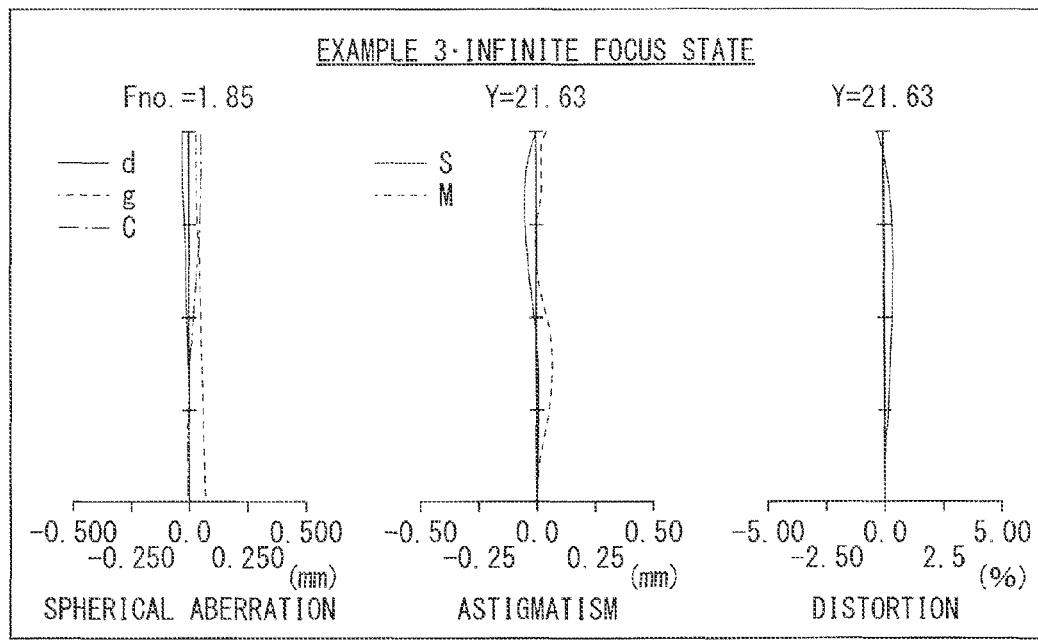
FIG. 16 is an aberration diagram showing various aberrations, in an infinite focus state, of an imaging lens in Numerical example 3 in which specific numerical values are applied to the imaging lens illustrated in FIG. 3.
Figure 17:
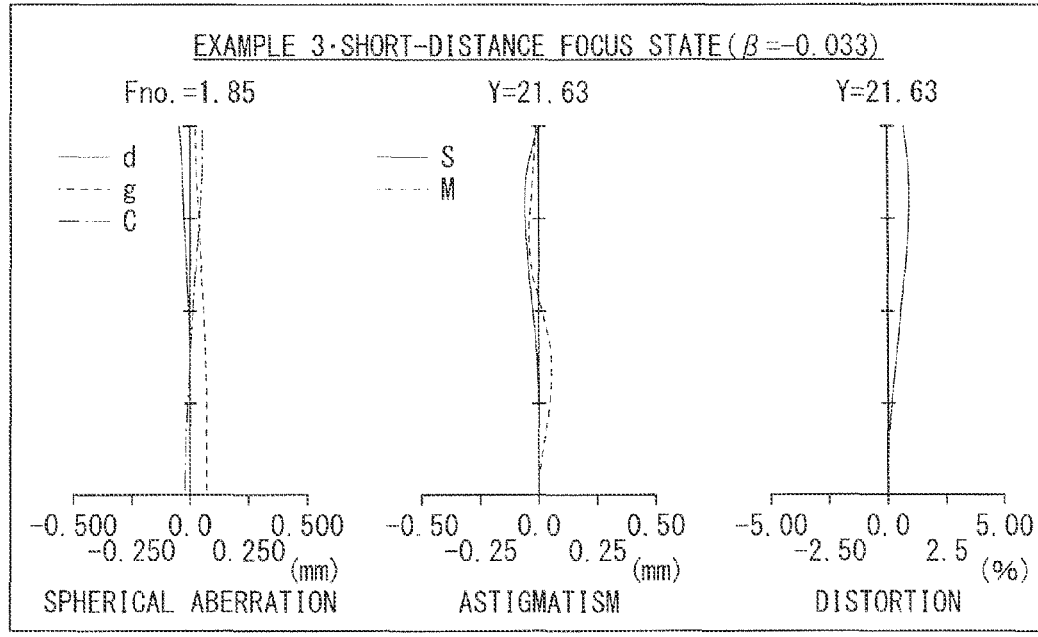
FIG. 17 is an aberration diagram showing various aberrations, in a short-distance focus state ($\beta=-0.033$), of the imaging lens in Numerical example 3 in which specific numerical values are applied to the imaging lens illustrated in FIG. 3.
Figure 18:
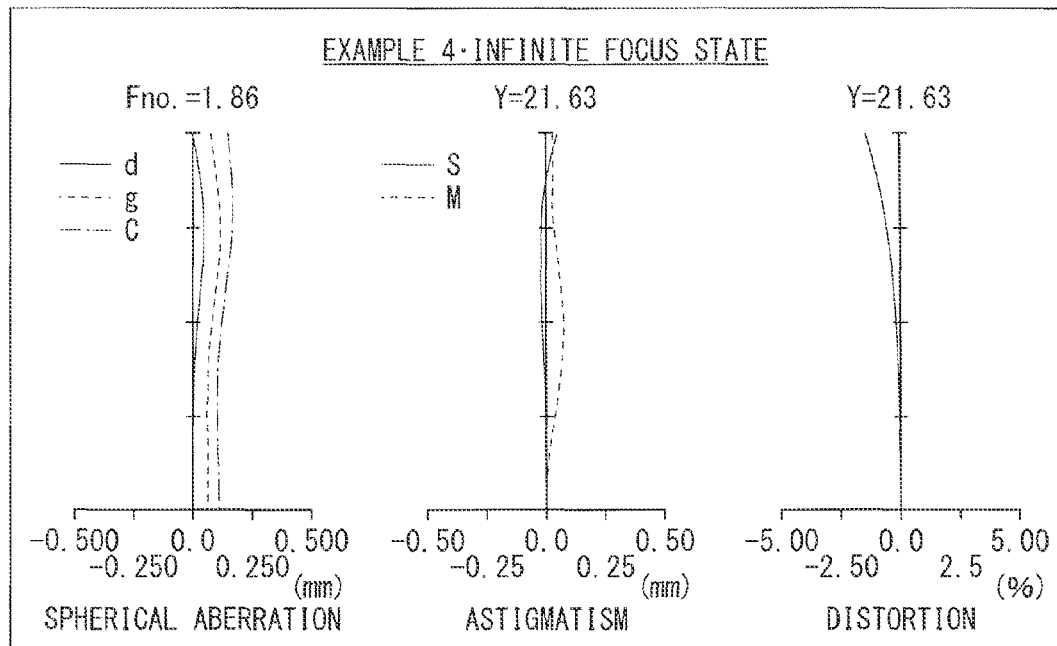
FIG. 18 is an aberration diagram showing various aberrations, in an infinite focus state, of an imaging lens in Numerical example 4 in which specific numerical values are applied to the imaging lens illustrated in FIG. 4.
Figure 19:
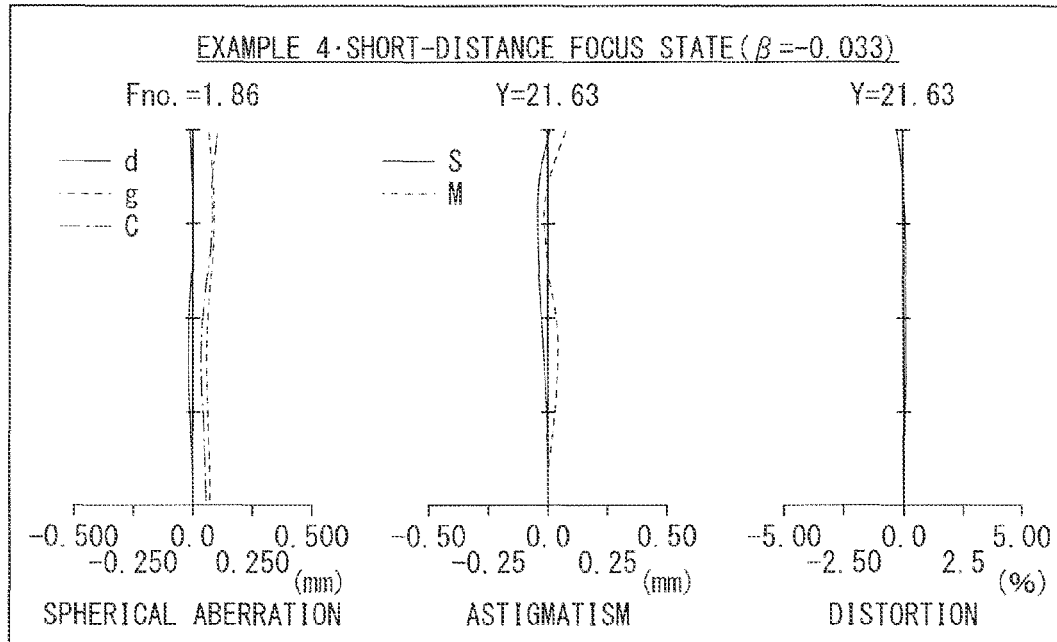
FIG. 19 is an aberration diagram showing various aberrations, in a short-distance focus state ($\beta=-0.033$), of the imaging lens in Numerical example 4 in which specific numerical values are applied to the imaging lens illustrated in FIG. 4.
Figure 20:
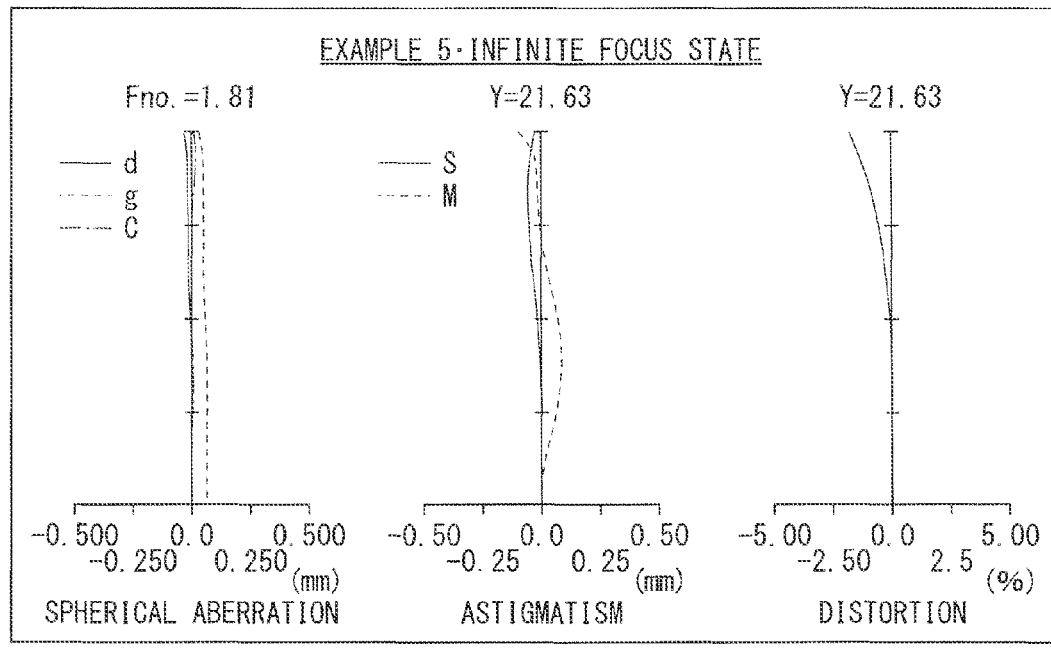
FIG. 20 is an aberration diagram showing various aberrations, in an infinite focus state, of an imaging lens in Numerical example 5 in which specific numerical values are applied to the imaging lens illustrated in FIG. 5.
Figure 21:
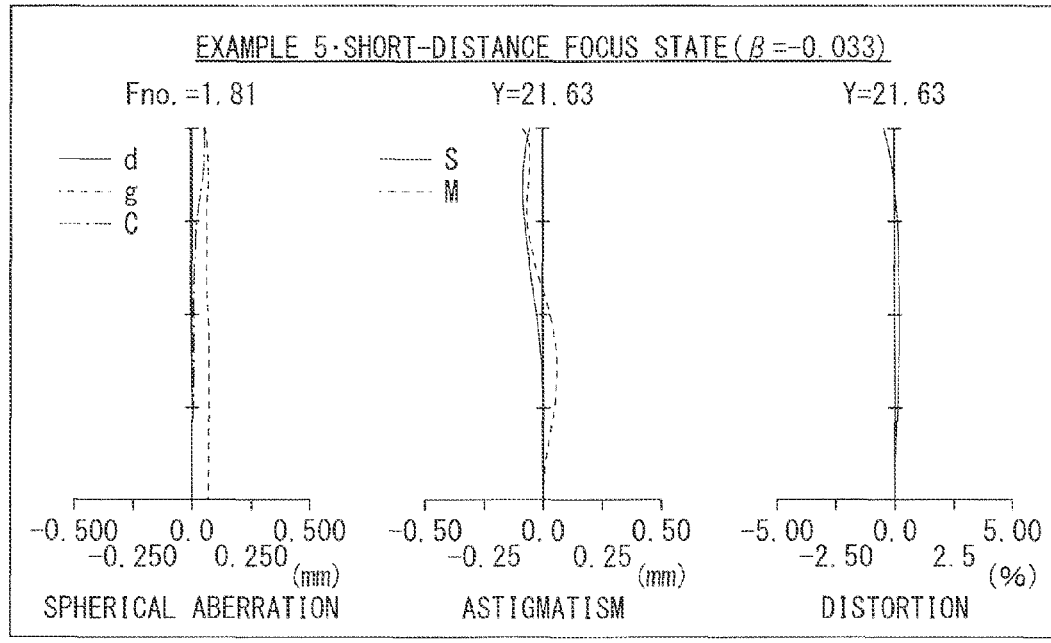
FIG. 21 is an aberration diagram showing various aberrations, in a short-distance focus state ($\beta=-0.033$), of the imaging lens in Numerical example 5 in which specific numerical values are applied to the imaging lens illustrated in FIG. 5.
Figure 22:
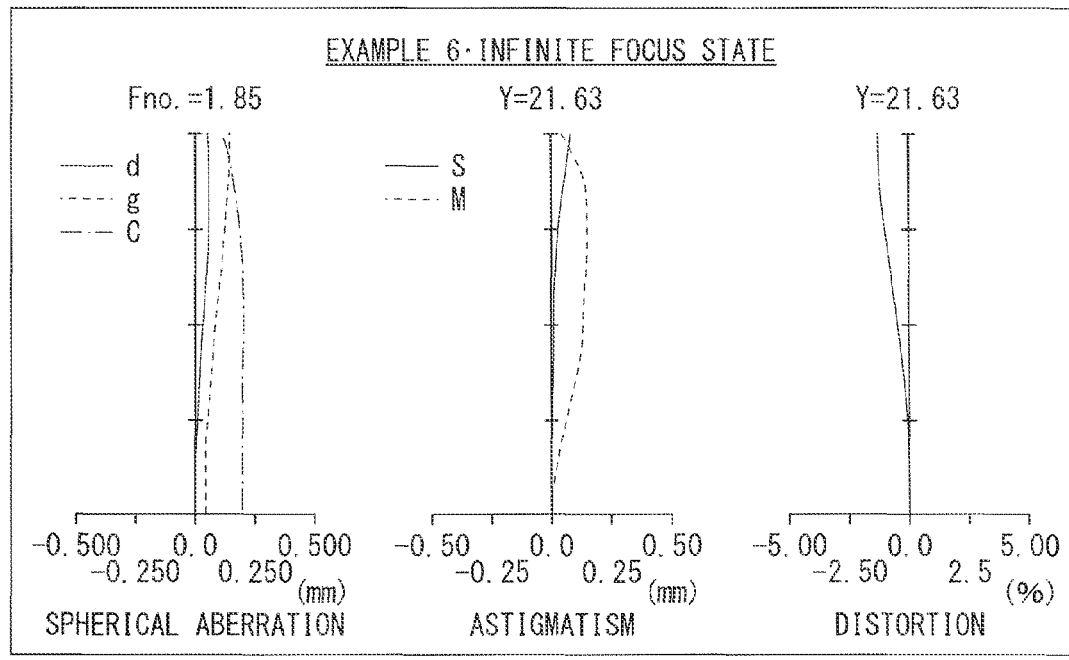
FIG. 22 is an aberration diagram showing various aberrations, in an infinite focus state, of an imaging lens in Numerical example 6 in which specific numerical values are applied to the imaging lens illustrated in FIG. 6.
Figure 23:
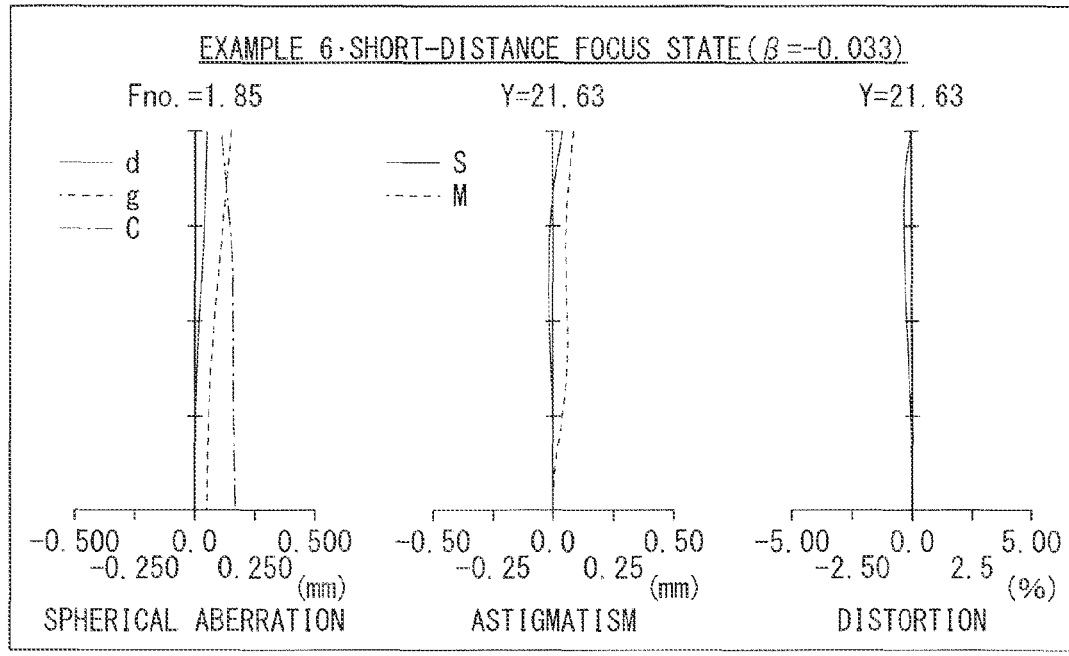
FIG. 23 is an aberration diagram showing various aberrations, in a short-distance focus state ($\beta=-0.033$), of the imaging lens in Numerical example 6 in which specific numerical values are applied to the imaging lens illustrated in FIG. 6.
Figure 24:
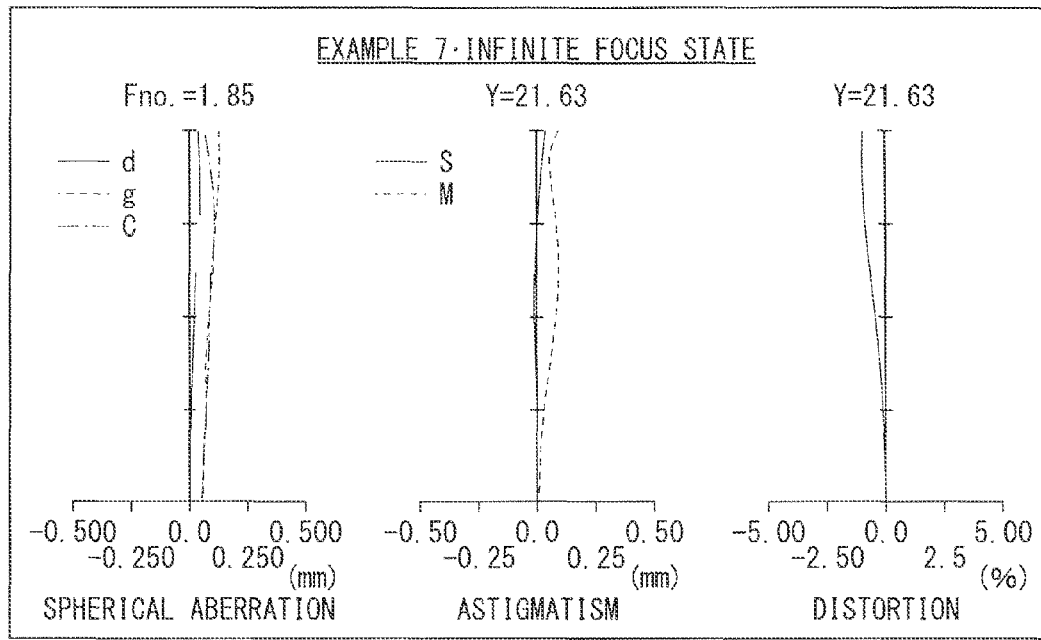
FIG. 24 is an aberration diagram showing various aberrations, in an infinite focus state, of an imaging lens in Numerical example 7 in which specific numerical values are applied to the imaging lens illustrated in FIG. 7.
Figure 25:
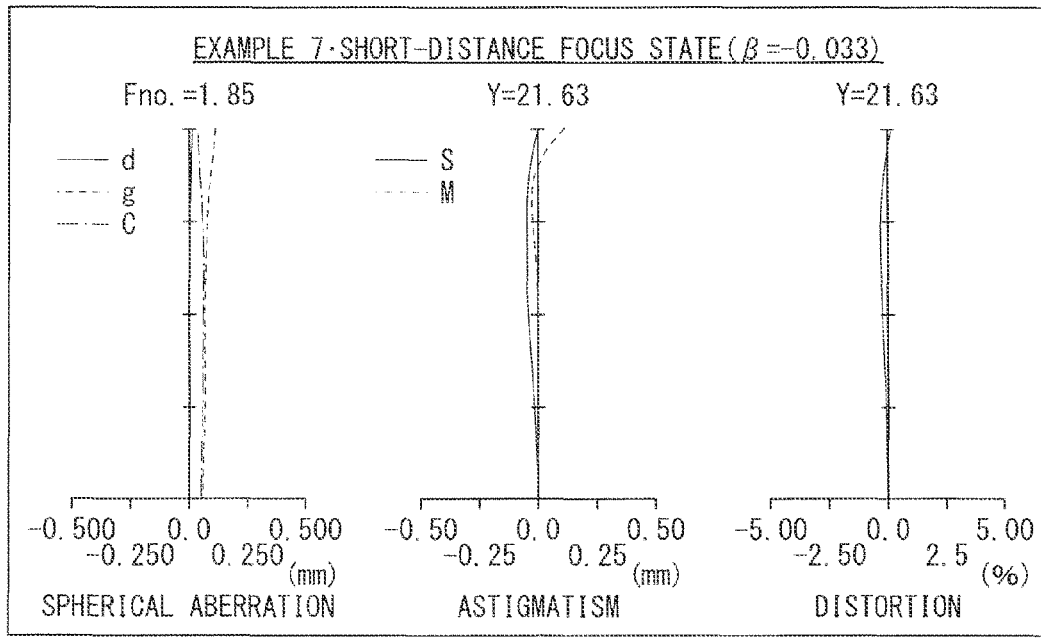
FIG. 25 is an aberration diagram showing various aberrations, in a short-distance focus state ($\beta=-0.033$), of the imaging lens in Numerical example 7 in which specific numerical values are applied to the imaging lens illustrated in FIG. 7.
Figure 26:
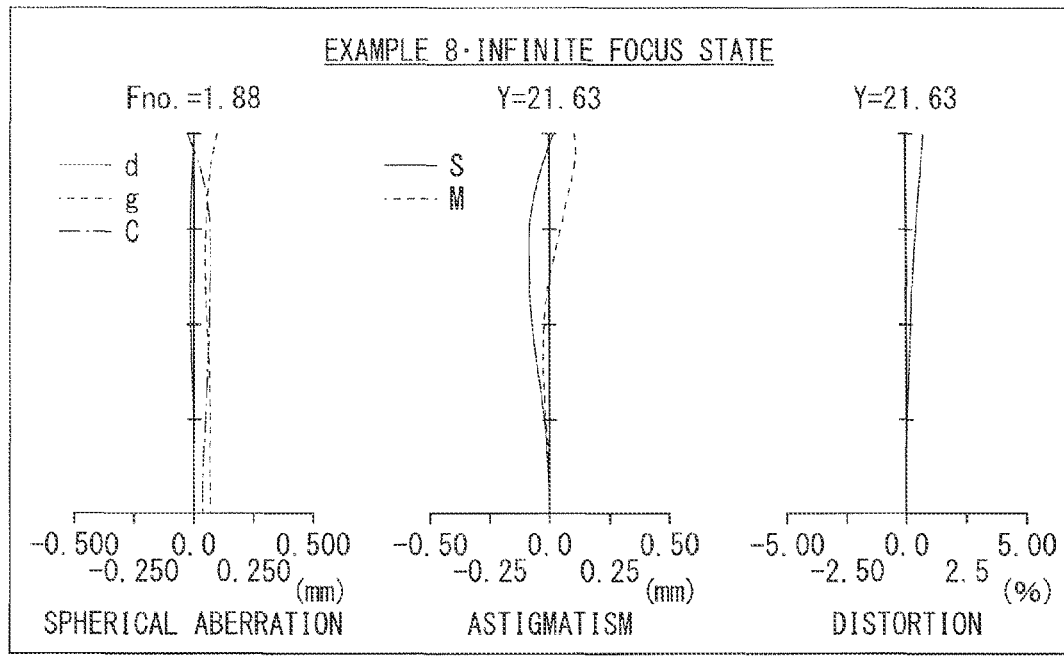
FIG. 26 is an aberration diagram showing various aberrations, in an infinite focus state, of an imaging lens in Numerical example 8 in which specific numerical values are applied to the imaging lens illustrated in FIG. 8.
Figure 27:
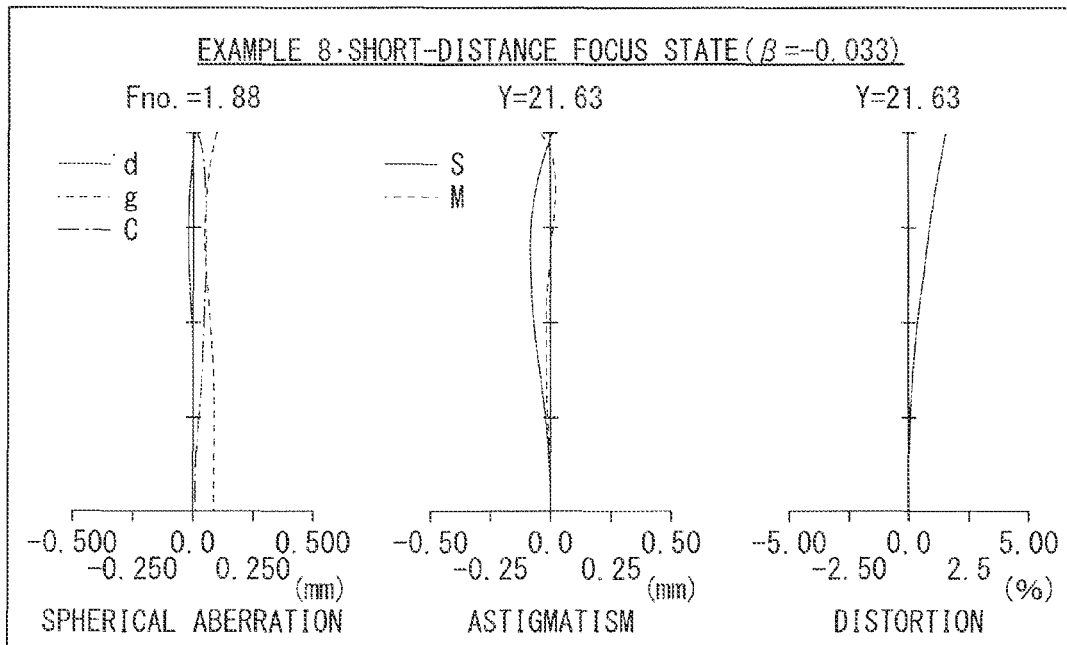
FIG. 27 is an aberration diagram showing various aberrations, in a short-distance focus state ($\beta=-0.033$), of the imaging lens in Numerical example 8 in which specific numerical values are applied to the imaging lens illustrated in FIG. 8.
Figure 28:
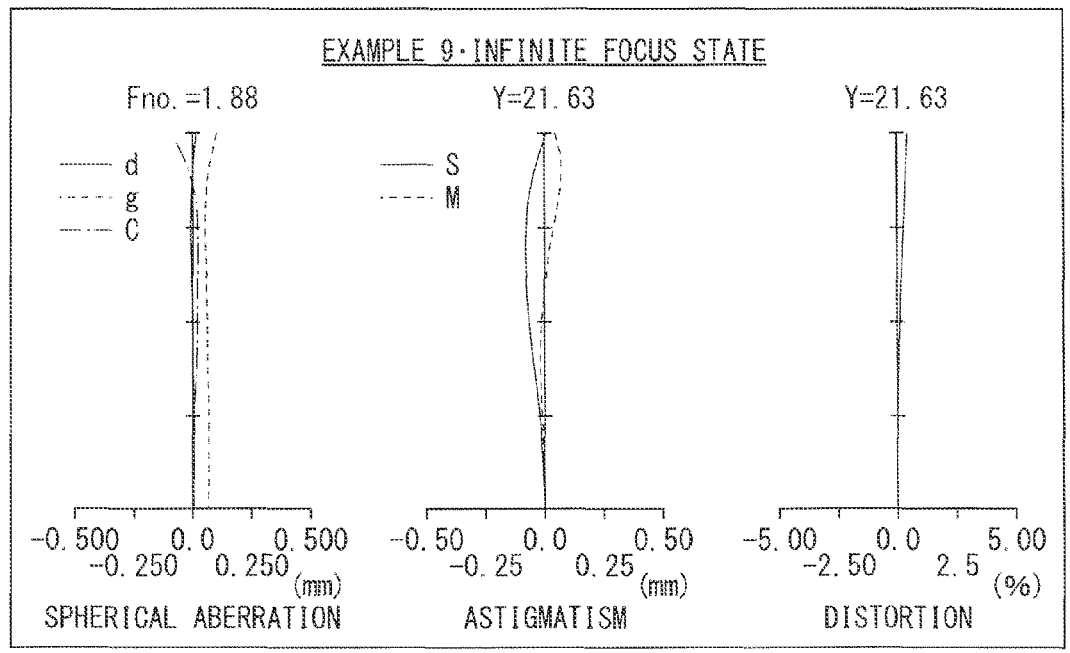
FIG. 28 is an aberration diagram showing various aberrations, in an infinite focus state, of an imaging lens in Numerical example 9 in which specific numerical values are applied to the imaging lens illustrated in FIG. 9.
Figure 29:
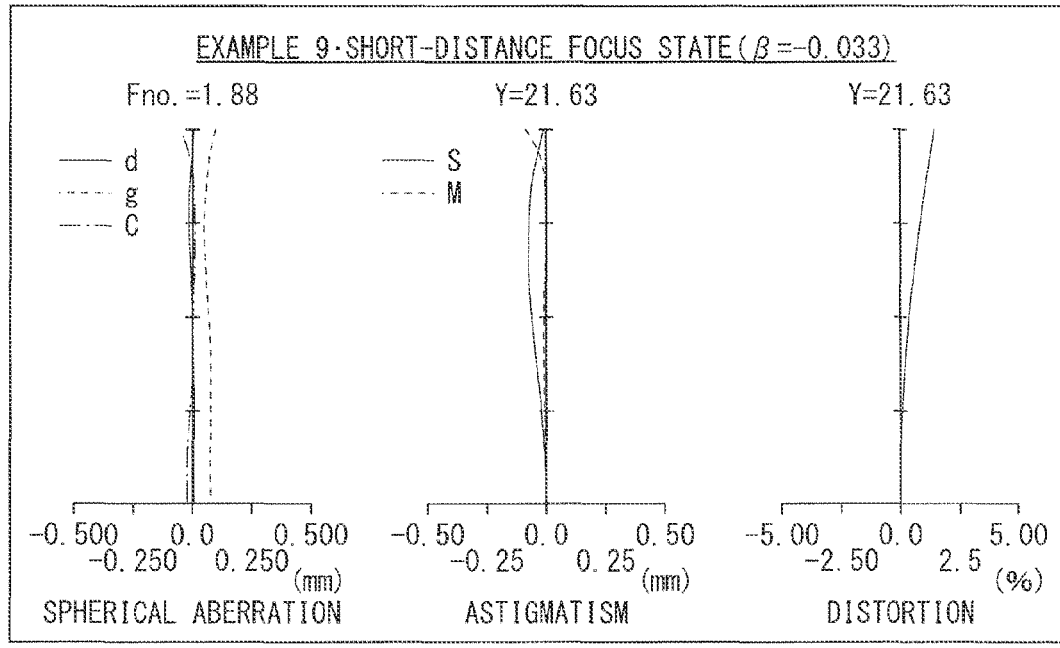
FIG. 29 is an aberration diagram showing various aberrations, in a short-distance focus state (β=−0.033), of the imaging lens in Numerical example 9 in which specific numerical values are applied to the imaging lens illustrated in FIG. 9.
Figure 30:
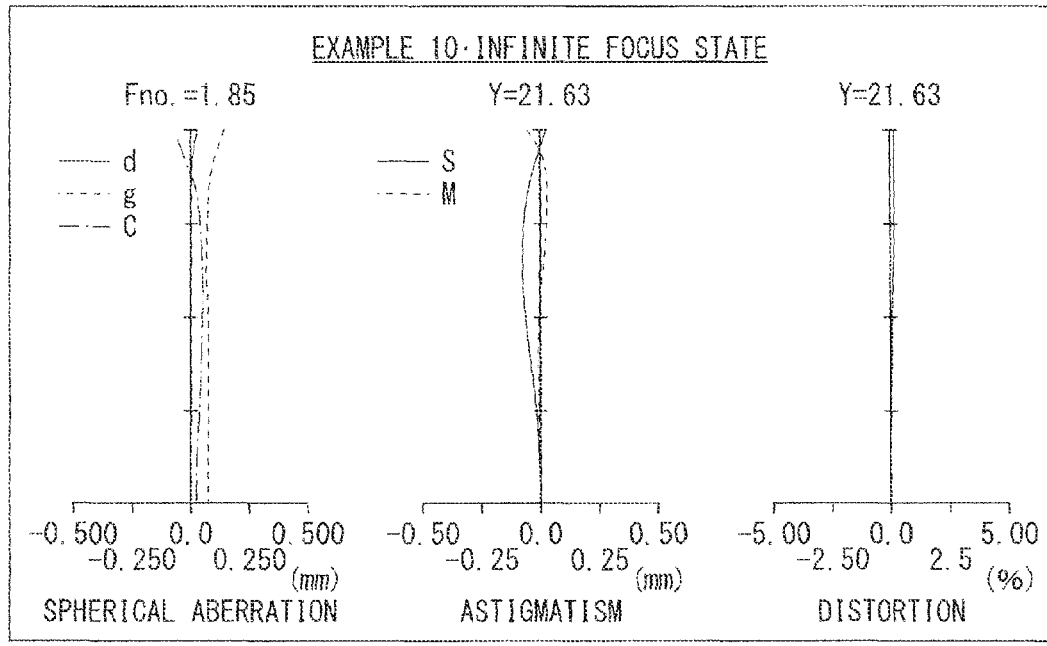
FIG. 30 is an aberration diagram showing various aberrations, in an infinite focus state, of an imaging lens in Numerical example 10 in which specific numerical values are applied to the imaging lens illustrated in FIG. 10.
Figure 31:
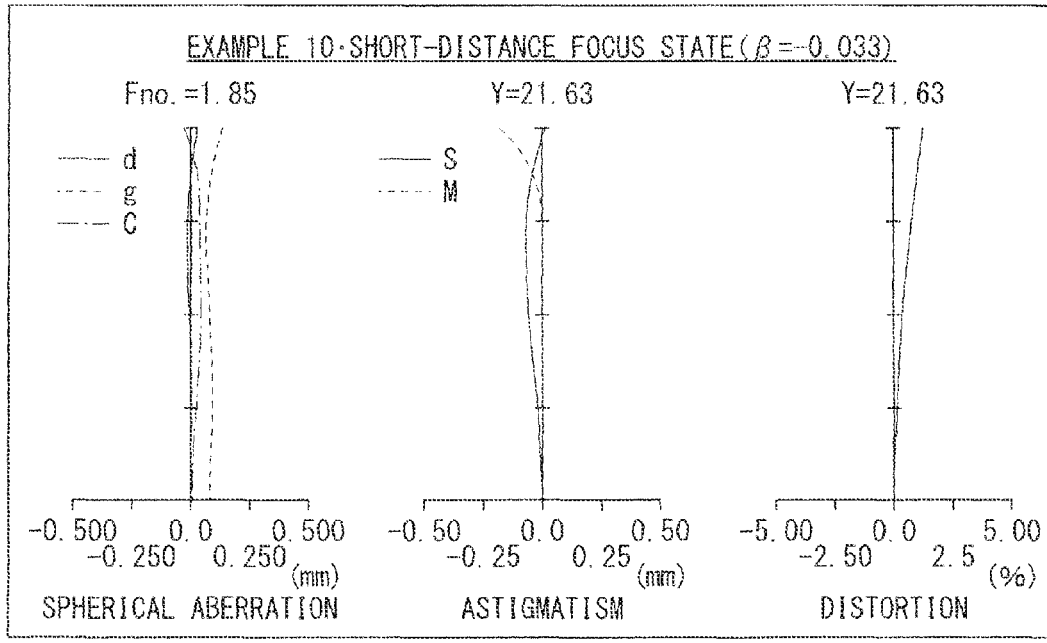
FIG. 31 is an aberration diagram showing various aberrations, in a short-distance focus state (β=−0.033), of the imaging lens in Numerical example 10 in which specific numerical values are applied to the imaging lens illustrated in FIG. 10.
Figure 32:
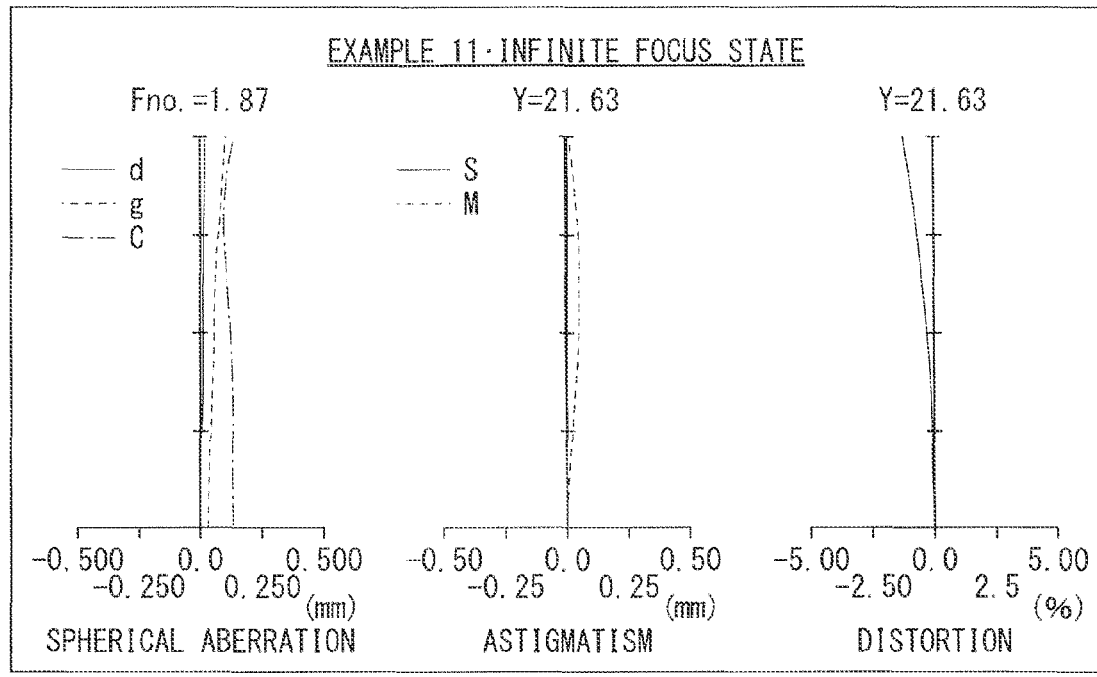
FIG. 32 is an aberration diagram showing various aberrations, in an infinite focus state, of an imaging lens in Numerical example 11 in which specific numerical values are applied to the imaging lens illustrated in FIG. 11.
Figure 33:
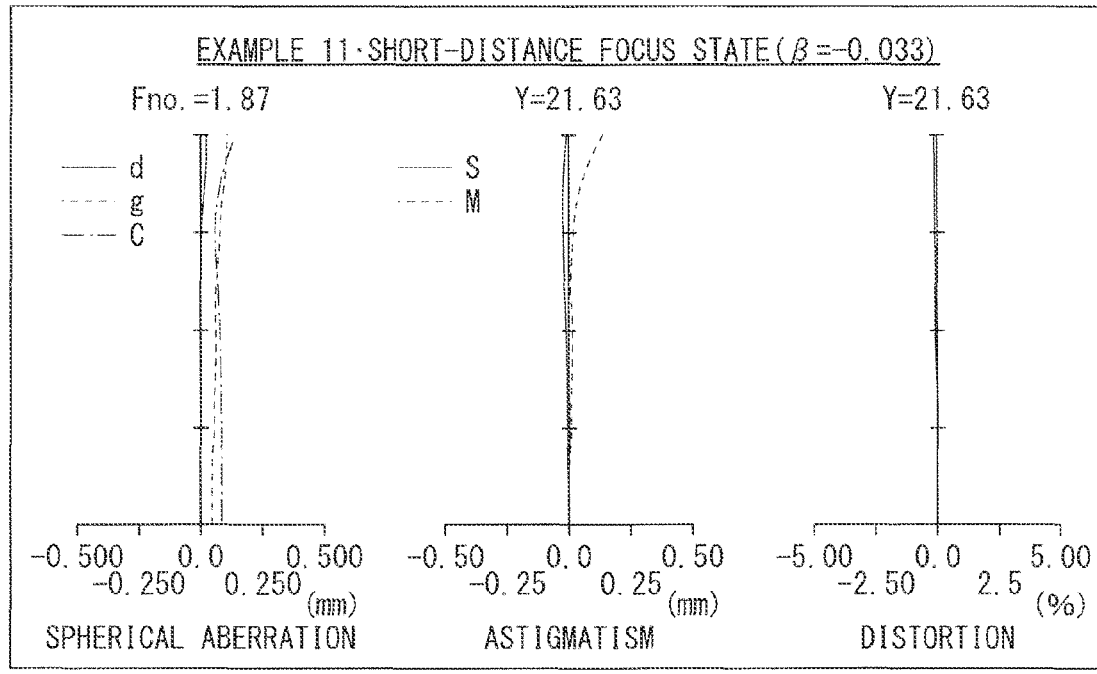
FIG. 33 is an aberration diagram showing various aberrations, in a short-distance focus state (β=−0.033), of the imaging lens in Numerical example 11 in which specific numerical values are applied to the imaging lens illustrated in FIG. 11.

In the imaging lens 11 illustrated in FIG. 11, the first lens group G1 includes, in order from the object side, a cemented lens configured of a positive meniscus lens L11 that has a concave surface facing toward the object side and a biconcave lens L12, a positive meniscus lens L13 that has a convex surface facing toward the object side, an aperture stop STO, and a cemented lens configured of a negative meniscus lens L14 that has a convex surface facing toward the object side and a biconvex lens L15. The second lens group G2 includes a negative meniscus lens L21 that has a convex surface facing toward the object side. The third lens group G3 includes a biconvex lens L31A, a negative meniscus lens L31B that has a convex surface facing toward the object side, and a cemented lens configured of a positive meniscus lens L32A that has a concave surface facing toward the object side and a positive meniscus lens L32B that has a concave surface facing toward the object side.

Table 31 shows lens data of Numerical example 11 to which specific numerical values are applied to the imaging lens 11. In Numerical example 11, the fifth, tenth, eleventh, and thirteenth surfaces are aspherical. Table 33 shows values of 4th, 6th, 8th, and 10th aspherical coefficients A4, A6, A8, and A10 of those aspherical surfaces, together with values of conic constant κ.

Table 32 shows values of total focal length f of the lens system, of F number Fno, and of a half angle of view ω at the infinite focus state. Also, Table 32 shows values of shooting magnification β in the short-distance focus state. In the imaging lens 11, the spacings in the front and the rear of the second lens group G2 vary through the focusing operation from the infinite object side toward the short-distance object side. Table 32 also shows values of variable spacings in each of the infinite focus state and the short-distance focus state.

TABLE 31

Example 11

| Surface No. | R | D | Nd | νd |
|---|---|---|---|---|
| 1 | −42.182 | 2.05 | 1.910822 | 35.3 |
| 2 | −29.059 | 1.00 | 1.595510 | 39.2 |
| 3 | 43.897 | 0.50 | | |
| 4 | 41.748 | 2.23 | 1.768015 | 49.2 |
| 5* | 223.214 | 2.73 | | |
| 6(STO) | ∞ | 1.00 | | |
| 7 | 51.458 | 1.00 | 1.755200 | 27.5 |
| 8 | 24.432 | 9.20 | 1.804200 | 46.5 |
| 9 | −49.853 | D9 | | |
| 10* | 54.661 | 1.00 | 1.487489 | 70.4 |
| 11* | 20.856 | D11 | | |
| 12 | 45.758 | 7.55 | 1.618806 | 63.9 |
| 13* | −34.021 | 0.00 | | |
| 14 | 154.168 | 4.51 | 1.688930 | 31.2 |
| 15 | 29.847 | 12.61 | | |
| 16 | −24.433 | 1.00 | 1.567320 | 42.8 |
| 17 | −114.643 | 2.04 | 1.735001 | 49.8 |
| 18 | −60.366 | 11.50 | | |
| 19 | ∞ | 2.00 | 1.516798 | 64.2 |
| 20 | ∞ | 1.00 | | |
| Image | ∞ | | | |

TABLE 32

Example 11

| | Infinite focus state | Short-distance focus state |
|---|---|---|
| Fno | 1.87 | — |
| f | 47.00 | — |
| ω | 24.98 | — |
| β | 0 | −0.033 |
| D9 | 1 | 2.35 |
| D11 | 9.56 | 8.21 |

TABLE 33

Example 11

| Surface No. | κ | A4 | A6 |
|---|---|---|---|
| 5 | 0.00000E+00 | 0.136704E−04 | 0.988283E−08 |
| 10 | 0.00000E+00 | −0.116882E−04 | −0.151685E−08 |

TABLE 33-continued

Example 11

| | | | |
|---|---|---|---|
| 11 | 0.00000E+00 | −0.951295E−05 | −0.197798E−07 |
| 13 | 0.00000E+00 | 0.453480E−05 | −0.749023E−08 |

| Surface No. | A8 | A10 |
|---|---|---|
| 5 | −0.106398E−11 | 0.274019E−13 |
| 10 | 0.00000E+00 | 0.00000E+00 |
| 11 | 0.317626E−10 | −0.192687E−12 |
| 13 | 0.517261E−10 | −0.110212E−12 |

Other Numerical Data of Respective Examples

Table 34 is a summary of values related to the above-described Conditional expressions (1) to (6) for the respective numerical examples. As can be seen from Table 34, the values related to the above-described Conditional expressions (1) to (6) in the respective numerical examples are within the numerical ranges thereof.

TABLE 34

| | Example 1 | Example 2 | Example 3 | Example 4 | Example 5 | Example 6 |
|---|---|---|---|---|---|---|
| Conditional expression (1) | 0.51 | 0.49 | 0.51 | 0.49 | 0.53 | 0.50 |
| Conditional expression (2) | 1.37 | 1.69 | 1.35 | 1.69 | 1.16 | 1.29 |
| Conditional expression (3) | 0.92 | 0.92 | 0.86 | 1.03 | 0.91 | 0.93 |
| Conditional expression (4) | −0.67 | −0.71 | −0.64 | −1.26 | −0.87 | −1.31 |
| Conditional expression (5) | 0.28 | 0.24 | 0.22 | 0.26 | 0.28 | 0.37 |
| Conditional expression (6) | 0.17 | 0.14 | 0.16 | 0.07 | 0.21 | 0.08 |

| | Example 7 | Example 8 | Example 9 | Example 10 | Example 11 |
|---|---|---|---|---|---|
| Conditional expression (1) | 0.49 | 0.48 | 0.48 | 0.49 | 0.52 |
| Conditional expression (2) | 2.43 | 1.28 | 1.20 | 1.13 | 2.98 |
| Conditional expression (3) | 1.34 | 0.80 | 0.83 | 0.73 | 1.49 |
| Conditional expression (4) | −0.65 | −3.65 | −5.10 | −7.04 | −0.59 |
| Conditional expression (5) | 0.10 | 0.36 | 0.35 | 0.39 | 0.14 |
| Conditional expression (6) | 0.07 | 0.10 | 0.11 | 0.14 | 0.09 |

Aberration Performance of Respective Examples

FIGS. 12, 14, 16, 18, 20, 22, 24, 26, 28, 30, and 32 show longitudinal aberrations, in the infinite focus state, of the imaging lenses 1 to 11 according to Numerical examples 1 to 11, respectively. FIGS. 13, 15, 17, 19, 21, 23, 25, 27, 29, 31, and 33 show longitudinal aberration, in the short-distance focus state (β=−0.033), of the imaging lenses 1 to 11 according to Numerical examples 1 to 11, respectively. Each of the aberration diagrams show, in order from the left, spherical aberration, astigmatism, and distortion. In the spherical aberration diagram, the vertical axis represents a ratio of a value of the spherical aberration to the open F number, and the horizontal axis represents a defocus amount. A solid line, a long-dashed line, and a short-dashed line denote spherical aberrations with respect to a d-line, a C-line (having a wavelength of 656.3 nm), and a g-line (having a wavelength of 436 nm), respectively. In the astigmatism diagram, the vertical axis represents an image height (Y), and the horizontal axis represents a defocus amount. A solid line (S) represents astigmatism of a sagittal image plane and a dashed line (M) represents astigmatism of a meridional image plane. In the distortion diagram, the vertical axis represents the image height (Y), and an amount of distortion is shown in %.

As can be seen from the respective aberration diagrams, various aberrations are favorably corrected and superior optical performances are achieved in the imaging lenses 1 to 11 according to Numerical examples 1 to 11.

5. Other Embodiments

The technology of the present disclosure is not limited to the description above of the example embodiments and numerical examples, and may be variously modified.

For example, the shapes of the respective sections and the numerical values in the respective numerical examples described above are mere specific examples to embody the present technology and the technical range of the present technology should not be limitedly construed based thereon.

In the example embodiments and numerical examples above, the configuration substantially including three lens groups has been described. However, a configuration may be adopted in which a lens that has substantially no refractive power is further provided.

It is possible to achieve at least the following configurations from the above-described example embodiments and the modifications of the disclosure.

[1] An imaging lens including:
a first lens group having positive refractive power;
a second lens group having negative refractive power; and
a third lens group having positive refractive power, the first to third lens groups being arranged in order from an object side toward an image side, wherein
a focusing operation is performed through allowing the second lens group to travel along an optical axis, and
the following conditional expressions are satisfied, $$0.40 < Da/TL < 0.65 \quad (1)$$

$$0.90 < f3/f < 3.50 \quad (2)$$

where
Da is an on-axial distance from an object-sided surface of the second lens group to an image-sided surface of the third lens group in an infinite focus state,
TL is an on-axial total length of the imaging lens,
f3 is a focal length of the third lens group, and
f is a total focal length of the imaging lens in the infinite focus state.

[2] The imaging lens according to [1], wherein the first lens group includes two or more negative lens components and two or more positive lens components.

[3] The imaging lens according to [1] or [2], wherein the following conditional expression is satisfied, $$0.60 < |f2/f| < 5.00 \quad (3)$$

where f2 is a focal length of the second lens group.

[4] The imaging lens according to any one of [1] to [3], wherein
the third lens group includes a front group and a rear group, the front group having positive refractive power, and the rear group having negative refractive power, and
the following conditional expression is satisfied, $$-9.00 < f\_3fr/f3 < -0.10 \quad (4)$$

where f_3fr is a focal length of the rear group in the third lens group.

[5] The imaging lens according to any one of [1] to [4], wherein the following conditional expression is satisfied, $$0 < |Db/f2| < 0.50 \quad (5)$$

where Db is an on-axial spacing between an image-sided surface of the second lens group and an object-sided surface of the third lens group in the infinite focus state.

[6] The imaging lens according to any one of [1] to [5], wherein
the third lens group includes a front group and a rear group, the front group having positive refractive power, and the rear group having negative refractive power, and
the following conditional expression is satisfied, $$0 < D\_3fr/f3 < 0.45 \quad (6)$$

where D_3fr is an on-axial spacing between an image-sided surface of the front group and an object-sided surface of the rear group.

[7] The imaging lens according to any one of [1] to [6], wherein the second lens group includes a single lens or two lens components.

[8] The imaging lens according to any one of [1] to [7], further including a lens having substantially no refractive power.

[9] An imaging apparatus including:
an imaging lens; and
an imaging device configured to output an imaging signal based on an optical image formed by the imaging lens,
the imaging lens including
a first lens group having positive refractive power,
a second lens group having negative refractive power, and
a third lens group having positive refractive power, the first to third lens groups being arranged in order from an object side toward an image side, wherein
a focusing operation is performed through allowing the second lens group to travel along an optical axis, and
the following conditional expressions are satisfied, $$0.40 < Da/TL < 0.65 \quad (1)$$

$$0.90 < f3/f < 3.50 \quad (2)$$

where
Da is an on-axial distance from an object-sided surface of the second lens group to an image-sided surface of the third lens group in an infinite focus state,
TL is an on-axial total length of the imaging lens,
f3 is a focal length of the third lens group, and f is a total focal length of the imaging lens in the infinite focus state.

[10] The imaging apparatus according to [9], further including a lens having substantially no refractive power.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging lens comprising:
a first lens group having positive refractive power;
a second lens group having negative refractive power; and
a third lens group having positive refractive power, the first to third lens groups being arranged in order from an object side toward an image side, wherein
a focusing operation is performed through allowing the second lens group to travel along an optical axis, and
the following conditional expressions are satisfied, $0.45 < Da/TL < 0.65$ $0.90 < f3/f < 3.50$ where Da is an on-axial distance from an object-sided surface of the second lens group to an image-sided surface of the third lens group in an infinite focus state,
TL is an on-axial total length of the imaging lens from an object-sided surface of the first lens group to an image-sided surface of the imaging lens,
f3 is a focal length of the third lens group, and
f is a total focal length of the imaging lens in the infinite focus state.

2. The imaging lens according to claim 1, wherein the first lens group includes two or more negative lens components and two or more positive lens components.

3. The imaging lens according to claim 1, wherein the following conditional expression is satisfied, $0.60 < |f2/f| < 5.00$ where f2 is a focal length of the second lens group.

4. The imaging lens according to claim 1, wherein
the third lens group includes a front group and a rear group, the front group having positive refractive power, and the rear group having negative refractive power, and
the following conditional expression is satisfied, $-9.00 < f\_3fr/f3 < -0.10$ where f_3fr is a focal length of the rear group in the third lens group.

5. The imaging lens according to claim 1, wherein the following conditional expression is satisfied, $0 < |Db/f2| < 0.50$ where Db is an on-axial spacing between an image-sided surface of the second lens group and an object-sided surface of the third lens group in the infinite focus state.

6. The imaging lens according to claim 1, wherein
the third lens group includes a front group and a rear group, the front group having positive refractive power, and the rear group having negative refractive power, and
the following conditional expression is satisfied, $0 < D\_3fr/f3 < 0.45$ where D_3fr is an on-axial spacing between an image-sided surface of the front group and an object-sided surface of the rear group.

7. The imaging lens according to claim 1, wherein the second lens group includes a single lens or two lens components.

8. An imaging apparatus comprising:
an imaging lens; and
an imaging device configured to output an imaging signal based on an optical image formed by the imaging lens,
the imaging lens including
a first lens group having positive refractive power,
a second lens group having negative refractive power, and
a third lens group having positive refractive power, the first to third lens groups being arranged in order from an object side toward an image side, wherein
a focusing operation is performed through allowing the second lens group to travel along an optical axis, and
the following conditional expressions are satisfied, $0.45 < Da/TL < 0.65$ $0.90 < f3/f < 3.50$ where Da is an on-axial distance from an object-sided surface of the second lens group to an image-sided surface of the third lens group in an infinite focus state,
TL is an on-axial total length of the imaging lens from an object-sided surface of the first lens group to an image-sided surface of the imaging lens,
f3 is a focal length of the third lens group, and
f is a total focal length of the imaging lens in the infinite focus state.

9. The imaging apparatus according to claim 8, wherein the first lens group includes two or more negative lens components and two or more positive lens components.

10. The imaging apparatus according to claim 8, wherein the following conditional expression is satisfied, $0.60 < |f2/f| < 5.00$ where f2 is a focal length of the second lens group.

11. The imaging apparatus according to claim 8, wherein
the third lens group includes a front group and a rear group, the front group having positive refractive power, and the rear group having negative refractive power, and
the following conditional expression is satisfied, $-9.00 < f\_3fr/f3 < -0.10$ where f_3fr is a focal length of the rear group in the third lens group.

12. The imaging apparatus according to claim 8, wherein the following conditional expression is satisfied, $0 < |Db/f2| < 0.50$ where Db is an on-axial spacing between an image-sided surface of the second lens group and an object-sided surface of the third lens group in the infinite focus state.

13. The imaging apparatus according to claim 8, wherein the third lens group includes a front group and a rear group, the front group having positive refractive power, and the rear group having negative refractive power, and the following conditional expression is satisfied, $$0 < D\_3fr/f3 < 0.45$$

where D_3fr is an on-axial spacing between an image-sided surface of the front group and an object-sided surface of the rear group.

14. The imaging apparatus according to claim 8, wherein the second lens group includes a single lens or two lens components.

15. An imaging lens comprising:

a first lens group having positive refractive power, a second lens group having negative refractive power, and a third lens group having positive refractive power, the first to third lens groups being arranged in order from an object side toward an image side, wherein a focusing operation is performed through allowing the second lens group to travel along an optical axis, and the following conditional expressions are satisfied, $$0.40 < Da/TL < 0.65$$

$$0.90 < f3/f < 3.50$$

where Da is an on-axial distance from an object-sided surface of the second lens group to an image-sided surface of the third lens group in an infinite focus state, TL is an on-axial total length of the imaging lens, f3 is a focal length of the third lens group, f is a total focal length of the imaging lens in the infinite focus state, and wherein the first lens group includes a first lens positioned nearest to the object-sided surface, the first lens having negative refractive power.

16. An imaging lens comprising:

a first lens group having positive refractive power, a second lens group having negative refractive power, and a third lens group having positive refractive power, the first to third lens groups being arranged in order from an object side toward an image side, wherein a focusing operation is performed through allowing the second lens group to travel along an optical axis, and the following conditional expressions are satisfied, $$0.40 < Da/TL < 0.65$$

$$0.90 < f3/f < 3.50$$

where Da is an on-axial distance from an object-sided surface of the second lens group to an image-sided surface of the third lens group in an infinite focus state, TL is an on-axial total length of the imaging lens, f3 is a focal length of the third lens group, f is a total focal length of the imaging lens in the infinite focus state, and wherein the first lens group includes a first lens positioned nearest to the object-sided surface, the first lens having a positive refractive power and a concave surface facing toward the object side.

\* \* \* \* \*